United States Patent [19]

Nakamura

[11] Patent Number: 5,604,310
[45] Date of Patent: Feb. 18, 1997

[54] VIBRATING GYROSCOPE

[75] Inventor: Takeshi Nakamura, Nagaokakyo, Japan

[73] Assignee: Murata Manufacturing Co., Ltd., Kyoto-fu, Japan

[21] Appl. No.: 319,040

[22] Filed: Oct. 6, 1994

[30]     Foreign Application Priority Data

Oct. 7, 1993  [JP]  Japan ................................. 5-277473
Dec. 7, 1993  [JP]  Japan ................................. 5-340668

[51] Int. Cl.$^6$ ........................... G01C 19/00; G01P 3/44; G01P 9/00; G01P 15/08
[52] U.S. Cl. ........................... 73/504.12; 73/504.14
[58] Field of Search ...................... 73/504, 505, 504.14, 73/504.12; 310/315, 316, 341; 74/5 R, 5.6 D

[56]           References Cited

U.S. PATENT DOCUMENTS 5,220,833  6/1993  Nakamura ................. 73/505
5,349,856  9/1994  Nakamura ................. 73/505

Primary Examiner—Hezron E. Williams
Assistant Examiner—Richard A. Moller
Attorney, Agent, or Firm—Nikaido Marmelstein Murray & Oram LLP

[57]              ABSTRACT

A vibrating gyroscope 10 includes a piezoelectric vibrator 12. A piezoelectric element 16c for feedback of the piezoelectric vibrator 12 is connected to an input terminal of an amplifier 22, an output terminal of the amplifier 22 is connected to an input terminal of a phase correction circuit 24. An output terminal of the phase correction circuit 24 is connected to piezoelectric elements 16a and 16b for both of driving and detecting via resistors 26a, 26b, 28a and 28b. Both ends of the resistor 28a are connected to a non-inverting input terminal and an inverting input terminal of a first differential amplifier circuit 30a, respectively. Both ends of the resistor 28b are connected to a non-inverting input terminal and an inverting input terminal of a second differential amplifier circuit 30b, respectively. Output terminals of the first differential amplifier circuit 30a and the second differential amplifier circuit 30b are connected to a non-inverting input terminal and an inverting input terminal of a third differential amplifier circuit 32, respectively. An output terminal of the third differential amplifier circuit 32 is connected to a smoothing circuit 50a via a synchronous detection circuit 40a.

9 Claims, 21 Drawing Sheets

VIBRATING GYROSCOPE

BACKGROUND OF THE INVENTION

1. Field of the Invention

The present invention relates to a vibrating gyroscope and, more particularly, to a vibrating gyroscope that is applied to a navigation system which detects a position of a mobile by detecting its rotational angular velocity and guides it properly, a system for damping a vibration such a device for protecting an unsteady hold which detects an external vibration and damps it properly, or the like.

2. Description of the Prior Art

FIG. 19 is a circuit diagram showing a prior art of a vibrating gyroscope. The vibrating gyroscope 1 includes a piezoelectric vibrator 2.

The piezoelectric vibrator 2 includes a regular triangular prism-shaped vibrating body 3, three piezoelectric elements 4a, 4b and 4c are formed on centers of three side faces of the vibrating body 3, respectively. In the piezoelectric vibrator 2, when similar driving signals are applied to, for example, the two piezoelectric elements 4a and 4b, the vibrating body 3 bends and vibrates in a direction perpendicular to a main surface of the piezoelectric element 4c. In this state, similar detecting signals are obtained from the piezoelectric elements 4a and 4b. Then, in this state, when a rotational angular velocity is applied to the piezoelectric vibrator 2 about an axis of the vibrating body 3, the bending and vibrating direction of the vibrating body 3 is changed by a Coriolis force, detecting signals responsive to the rotational angular velocity are obtained from the two piezoelectric elements 4a and 4b. In this case, for example, a voltage of one detecting signal from the piezoelectric element 4a becomes larger and a voltage of the other detecting signal from the piezoelectric element 4b becomes smaller responsive to the rotational angular velocity.

Thus, the piezoelectric element 4c of the piezoelectric vibrator 2 is connected to an input terminal of an oscillation circuit 5 consisting of, for example, an amplifier. An output terminal of the oscillation circuit 5 is connected to ends of two resistors 6a and 6b, the other ends of the resistors 6a and 6b are connected to the two piezoelectric elements 4a and 4b, respectively. The piezoelectric elements 4a and 4b are connected to a non-inverting input terminal and an inverting input terminal of a differential amplifier circuit 7, respectively.

Accordingly, in the vibrating gyroscope 1, by an output signal from the differential amplifier circuit 7, it can be detected that any rotational angular velocity is not applied, or an applied rotational angular velocity can be detected.

However, in the vibrating gyroscope 1, since the resistor 6a and the piezoelectric element 4a are connected in series and the resistor 6b and the piezoelectric element 4b are connected in series as shown in FIG. 20, when a resonance characteristic of the piezoelectric vibrator 2 is shifted and each impedance of the piezoelectric elements 4a and 4b is changed and is different from each other by changing an atmospheric temperature or environment, phases of driving signals L and R applied to the piezoelectric elements 4a and 4b are different from each other, for example, as L=Vsin(x+5) and R=Vsin(x−5) shown in FIG. 21.

Since the driving signals L and R are applied to the non-inverting input terminal and the inverting input terminal of the differential amplifier circuit 7, when any rotational angular velocity is not applied to the vibrating gyroscope 1 in particular, as shown in FIG. 21, the output signal L-R which is not zero is obtained from the output terminal of the differential amplifier circuit 7, that is, an offset change (a drift) is generated. Thus, there is a problem it is not detected by the output signal from the differential amplifier circuit 7 that any rotational angular velocity is not applied to the vibrating gyroscope 1.

In order to solve the above problem, there is a method for correcting the output signal from the differential amplifier circuit by using a circuit for treating a signal or a circuit having a learning function. However, in the method, a circuit becomes a large scale and a complex structure, and it is not enough for a good characteristic since it is necessary that a circuit is adjusted to a special condition. Because, it fails to discriminate between a change of a signal generated by changing the resonance characteristic of the vibrator and a change of a signal generated by changing the applied rotational angular velocity, and it fails to discriminate a shift of the resonance characteristic not having any directional characteristic.

SUMMARY OF THE INVENTION

Therefore, it is a primary object of the present invention to provide a vibrating gyroscope which has a simple structure and is capable of suppressing a drift.

A vibrating gyroscope according to the present invention is a vibrating gyroscope having two driving detecting circuits comprising a first dividing means for dividing a signal on one driving detecting circuit into two signals which are different levels, a first detecting means for detecting a signal of a difference between two signals divided by the first dividing means, a second dividing means for dividing a signal on the other driving detecting circuit into two signals which are different levels, a second detecting means for detecting a signal of a difference between two signals divided by the second dividing means, and a first composite means for composing a signal from the first detecting means and a signal from the second detecting means.

The other vibrating gyroscope according to the present invention is a vibrating gyroscope having a driving detecting circuit comprising a dividing means for dividing a signal on the driving detecting circuit into two signals which are different levels, a detecting means for detecting a signal of a difference between two signals divided by the dividing means, and a first synchronous detection means for synchronously detecting a signal from the detecting means.

In the vibrating gyroscope according to the present invention, by the first dividing means, the signal on one driving detecting circuit is divided into two signals which are different levels. The signal of the difference between the two signals is detected by the first detecting means. Thus, even if a phase of a driving signal on one driving detecting circuit is shifted, in association with the driving signal, a similar signal is obtained from the first detecting means. Furthermore, a signal proportional to one detecting signal on one driving detecting circuit is obtained from the first detecting means.

By the second dividing means, the signal on the other driving detecting circuit is divided into two signals which are different levels. The signal of the difference between the two signals is detected by the second detecting means. Thus, even if a phase of a driving signal on the other driving detecting circuit is shifted, in association with the driving signal, a similar signal is obtained from the second detecting means. Furthermore, a signal proportional to the other detecting signal on the other driving detecting circuit is obtained from the second detecting means.

By the first composite means, the signal from the first detecting means and the signal from the second detecting means are composed. Thus, in association with the driving signals, when the signal composed the signal from the first detecting means and the signal from the second detecting means is adjusted to about zero, even if phases of one driving signal and the other driving signal are shifted, signals associated with those driving signals are offset each other. The signal from the first composite means becomes a signal nearly proportional to a difference between one detecting signal and the other detecting signal, that is, a signal nearly proportional to an applied rotational angular velocity.

In the other vibrating gyroscope according to the present invention, by the dividing means, the signal on the driving detecting circuit is divided into two signal which are different levels. The signal of the difference between the two signals is detected by the detecting means. Thus, even if a phase of the driving signal on the driving detecting circuit is shifted, in association with the driving signal, a similar signal is obtained from the detecting means. Furthermore, a signal proportional to a detecting signal on the driving detecting circuit is obtained from the detecting means. In this case, there is a phase difference of 90 degree between the signal associated with the driving signal and the signal proportional to the detecting signal, on the signal obtained from the detecting means.

By the first synchronous detection means, the signal obtained from the detecting means is detected in synchronous with the detecting signal. Thus, the signal associated with the driving signal on the signal obtained from the detecting means is offset at a positive part and a negative part. Accordingly, the signal obtained from the first synchronous detection means becomes the signal proportional to the detecting signal, that is, a signal nearly proportional to an applied rotational angular velocity.

According to the present invention, it can obtain a vibrating gyroscope wherein even if the phases of one driving signal and the other driving signal are shifted by changing the atmospheric temperature or environment, the signals associated with the driving signals are offset each other, a drift is hardly generated. Thus, in the vibrating gyroscope according to the present invention, even if there is a change of the atmospheric temperature or environment, an applied rotational angular velocity can be detected.

In the vibrating gyroscope according to the present invention, since two dividing means, two detecting means and one composite means are used and it is unnecessary to use a circuit for treating a signal or a circuit having a learning function, it becomes a simple structure.

According to the present invention, it can obtain the other vibrating gyroscope wherein even if the phase of the driving signal is shifted by changing the atmospheric temperature or environment, the signal associated with the driving signal is offset, a drift is hardly generated. Thus, in the other vibrating gyroscope according to the present invention, even if there is a change of the atmospheric temperature or environment, an applied rotational angular velocity can be detected.

In the other vibrating gyroscope according to the present invention, since it is unnecessary to use a circuit for treating a signal or a circuit having a learning function, it becomes a simple structure.

The above and other objects, features, aspects and advantages of the present invention will become more apparent from the following detailed description of the embodiments with reference to the accompanying drawings.

DESCRIPTION OF THE PREFERRED EMBODIMENTS

Figure 1:
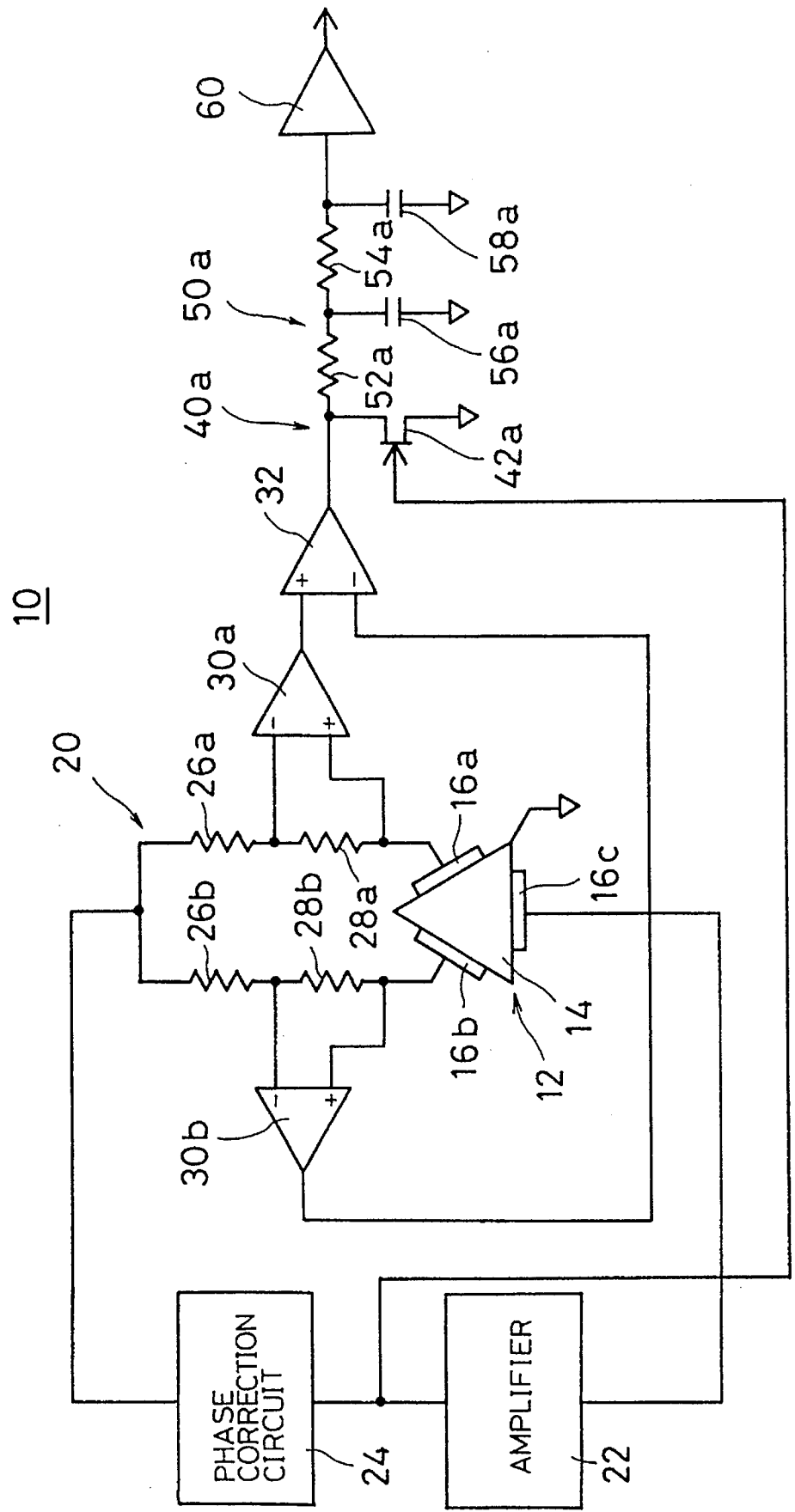
FIG. 1 is a circuit diagram showing one embodiment of the present invention.
Figure 19:
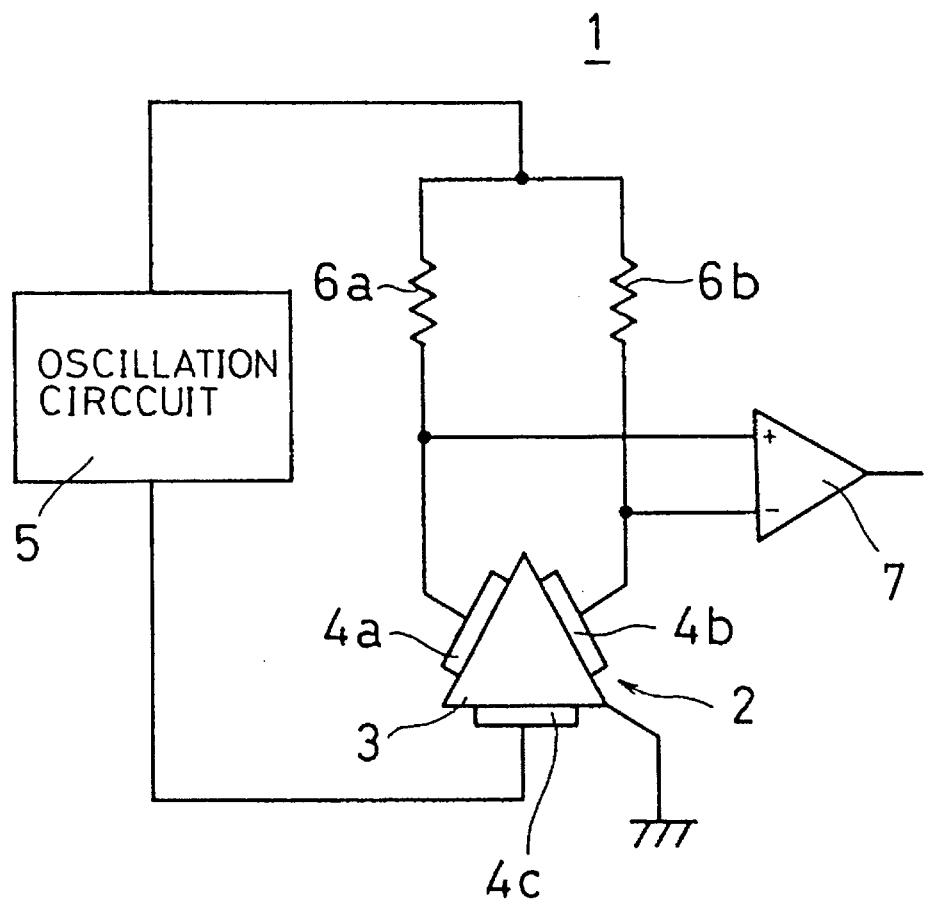
FIG. 19 is a circuit diagram showing a prior art of a vibrating gyroscope.
Figure 20:
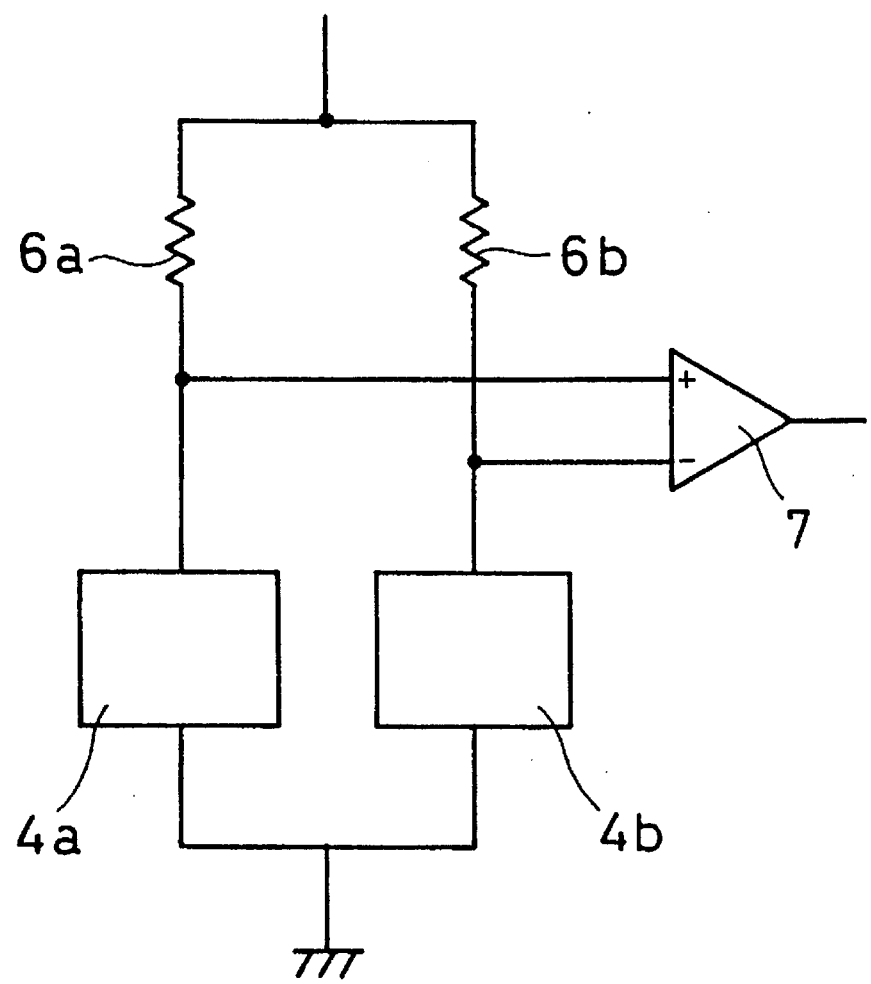
FIG. 20 is an equivalent circuit diagram showing an essential part of the vibrating gyroscope shown in FIG. 19.
Figure 21:
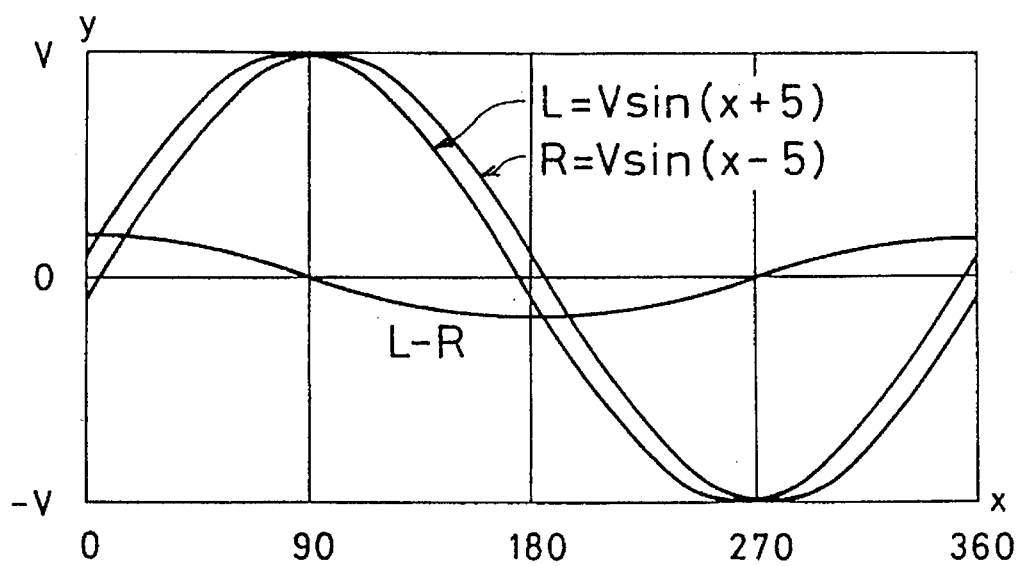
FIG. 21 is a graph showing an example of signals on input sides and an output side of a differential amplifier circuit caused by a driving signal in the vibrating gyroscope shown in FIG. 19.

FIG. 1 is a circuit diagram showing one embodiment of the present invention. The vibrating gyroscope 10 includes a piezoelectric vibrator 12 similar to the piezoelectric vibrator 2 of the vibrating gyroscope 1 shown in FIG. 19.

That is, the piezoelectric vibrator 12 includes, for example, a regular triangular prism-shaped vibrating body 14. The vibrating body 14 is formed with a material which generally generates a mechanical vibration such as elinver, iron-nickel alloy, quartz, glass, crystal, ceramics and the like. On nearly centers of three side faces of the vibrating body 14, three piezoelectric elements 16a, 16b and 16c are formed, respectively.

In the embodiment, for example, two piezoelectric elements 16a and 16b of the piezoelectric vibrator 12 are used for both of driving and detecting, the other piezoelectric element 16c is used for feedback.

To the three piezoelectric elements 16a, 16b and 16c of the piezoelectric vibrator 12, a driving and detecting circuit 20 is connected.

The driving and detecting circuit 20 includes, for example, an amplifier 22 for generating a driving signal. To an input terminal of the amplifier 22, the piezoelectric element 16c for feedback is connected. An output terminal of the amplifier 22 is connected to an input terminal of a phase correction circuit 24. The phase correction circuit 24 is for correcting a phase of the driving signal.

An output terminal of the phase correction circuit 24 is connected to one piezoelectric element 16a for both of driving and detecting via two resistors 26a and 28a as a first dividing means which are connected in series and have same resistance. One driving detecting circuit is constituted with the first dividing means in cooperation with the amplifier 22, the phase correction circuit 24 and so on, and the first dividing means is for dividing a signal on the driving detecting circuit into two signals which are different levels.

Furthermore, the output terminal of the phase correction circuit 24 is connected to the other piezoelectric element 16b for both of driving and detecting via two resistors 26b and 28b as a second dividing means which are connected in series and have same resistance. The other driving detecting circuit is constituted with the second dividing means in cooperation with the amplifier 22, the phase correction circuit 24 and so on, and the second dividing means is for dividing a signal on the driving detecting circuit into two signals which are different levels.

Meanwhile, to the vibrating body 14 of the piezoelectric vibrator 12, an intermediate electric potential between the electric potential of the power supply voltage Vcc and the grounding electric potential, for example, the half of the electric potential of the power supply voltage Vcc is applied.

Both ends of one resistor 28a of the first dividing means are connected to a non-inverting input terminal and an inverting input terminal of a first differential amplifier circuit 30a as a first detecting means, respectively. The first detecting means is for detecting a signal of a difference between two signals divided by the first dividing means.

Furthermore, both ends of one resistor 28b of the second dividing means are connected to a non-inverting input terminal and an inverting input terminal of a second differential amplifier circuit 30b as a second detecting means, respectively. The second dividing means is for detecting a signal of a difference between the two signals divided by the second dividing means.

An output terminal of the first differential amplifier circuit 30a and an output terminal of the second differential amplifier circuit 30b are connected to a non-inverting input terminal and an inverting input terminal of a third differential amplifier circuit 32 as a first composite means, respectively. The first composite means is for composing a signal from the first differential amplifier circuit 30a and a signal from the second differential amplifier circuit 30b and detecting a signal of a difference between those signals.

Furthermore, an output terminal of the third differential amplifier circuit 32 is connected to an input terminal of a first smoothing circuit 50a via a first synchronous detection circuit 40a. The first synchronous detection circuit 40a is for detecting a signal from the third differential amplifier circuit 32 in synchronous with a detecting signal mentioned later. The first synchronous detection circuit 40a includes, for example, an FET 42a as a switching element. To a drain of the FET 42a, the output terminal of the third differential amplifier circuit 32 is connected. To a source of the FET 42a, the half of the electric potential of the power supply voltage Vcc is applied. Furthermore, to a gate of the FET 42a, the output terminal of the amplifier 22 is connected.

The first smoothing circuit 50a is for smoothing a signal from the first synchronous detection circuit 40a. The first smoothing circuit 50a is constituted with two resistors 52a and 54a and two capacitors 56a and 58a.

An output terminal of the first smoothing circuit 50a is connected to an input terminal of an amplifier circuit 60. The amplifier circuit 60 is for amplifying a signal from the first smoothing circuit 50a.

Next, the operation of the vibrating gyroscope 10 shown in FIG. 1 will be described.

First, it will be described in association with driving signals applied the piezoelectric elements 16a and 16b of the piezoelectric vibrator 12.

In the vibrating gyroscope 10, driving signals generated by the amplifier 22 are applied to the resistor 26a of the first dividing means and the resistor 26b of the second dividing means via the phase correction circuit 24, respectively. In this case, phases of the driving signals are corrected by the phase correction circuit 24 so as to obtain stable driving signals.

One driving signal passed the resistors 26a and 28a as the first dividing means is applied to the piezoelectric element 16a, similarly, the other driving signal passed the resistors 26b and 28b as the second dividing means is applied to the piezoelectric element 16b. In this case, to the piezoelectric elements 16a and 16b, similar driving signals are applied. Thus, the vibrating body 14 of the piezoelectric vibrator 12 bends and vibrates in a direction perpendicular to a main surface of the piezoelectric element 16c.

Figure 2:
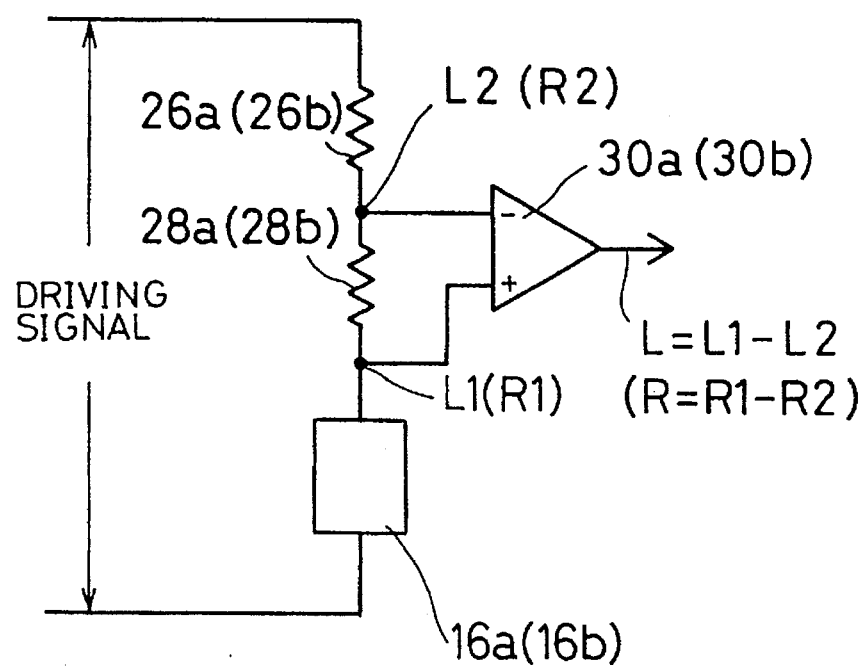
FIG. 2 is a circuit diagram showing signals on input sides and an output side of a first differential amplifier circuit (a second differential amplifier circuit) caused by a driving signal in the embodiment shown in FIG. 1.

As shown in FIG. 2, the driving signal on one driving detecting circuit is divided into two different signals L1 and L2 at both ends of the resistor 28a of the first dividing means. In this case, the signal L1 is equal to the driving signal applied to the piezoelectric element 16a. Since the resistances of the resistors 26a and 28a of the first dividing means are the same, the voltage of the signal L2 becomes the double voltage of the voltage of the signal L1, and the phase thereof becomes the half of the phase of the signal L1. The two signals L1 and L2 are applied to the non-inverting input terminal and the inverting input terminal of the first differential amplifier circuit 30a, respectively. Thus, the signal L=L1−L2 of the difference between the two signals L1 and L2 is detected by the first differential amplifier circuit 30a.

Similarly, the driving signal on the other driving detecting circuit is divided into two different signals R1 and R2 at both ends of the resistor 28b of the second dividing means. In this case, the signal R1 is equal to the driving signal applied to the piezoelectric element 16b. Since the resistances of the resistors 26b and 28b of the second dividing means are the same, the voltage of the signal R2 becomes the double voltage of the voltage of the signal R1, and the phase thereof becomes the half of the phase of the signal R1. The two signals R1 and R2 are applied to the non-inverting input terminal and the inverting input terminal of the second differential amplifier circuit 30b, respectively. Thus, the signal R=R1−R2 of the difference between the two signals R1 and R2 is detected by the second differential amplifier circuit 30b.

Furthermore, by the third differential amplifier circuit 32, the signal L from the first differential amplifier circuit 30a and the signal R from the second differential amplifier circuit 30b are composed, and the signal L-R of the difference between those signals is detected.

Next, it will be described that the phase of the driving signal L1 applied to the piezoelectric element 16a and the phase of the driving signal R1 applied to the piezoelectric element 16b are different from each other by changing the atmospheric temperature or environment, for example, as L1=Vsin(x+5) and R1=Vsin(x−5).

Figure 3:
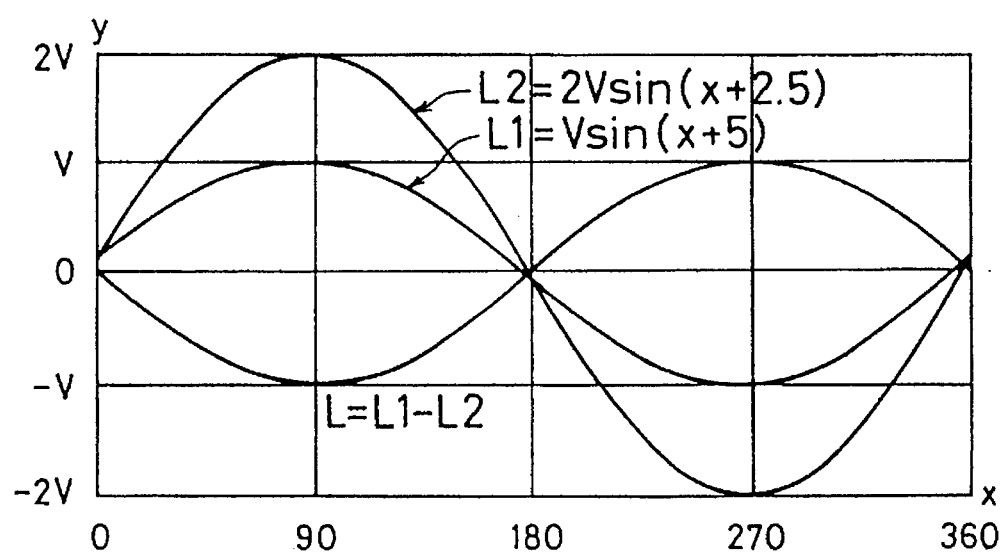
FIG. 3 is a graph showing an example of signals on the input sides and the output side of the first differential amplifier circuit caused by the driving signal in the embodiment shown in FIG. 1.

By the above-mentioned first dividing means, the signal L1 applied to the non-inverting input terminal of the first differential amplifier circuit 30a becomes Vsin(x+5), the signal L2 applied to the inverting input terminal of the first differential amplifier circuit 30a becomes 2Vsin(x+2.5). The amplitude of the signal L from the first differential amplifier circuit 30a becomes about V, the phase thereof becomes about 180 degree, the signal L becomes about Vsin(x−180). The relation between the signals L1, L2 and L is shown in FIG. 3.

Figure 4:
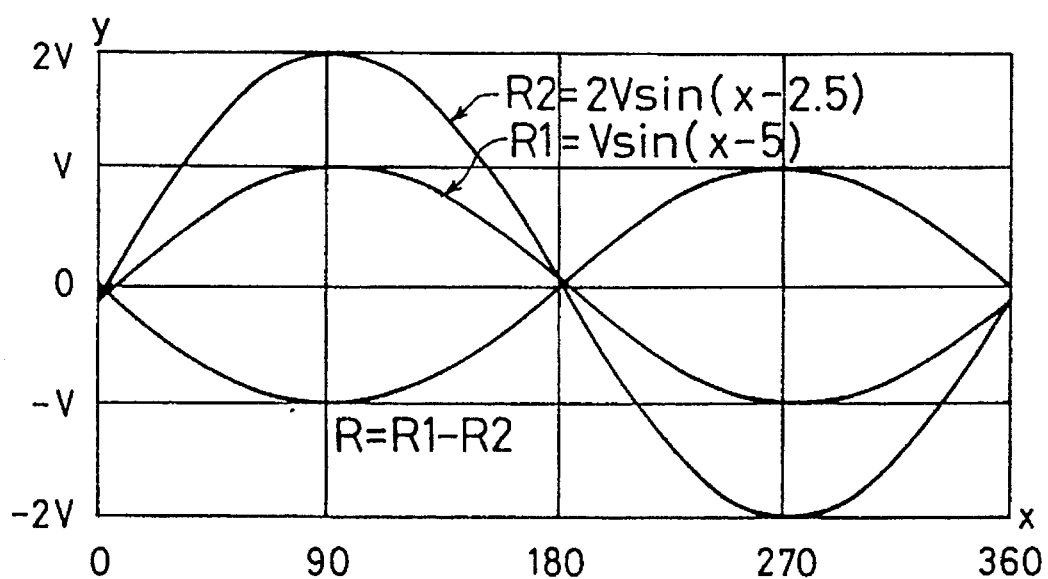
FIG. 4 is a graph showing an example of signals on the input sides and the output side of the second differential amplifier circuit caused by the driving signal in the embodiment shown in FIG. 1.

By the above-mentioned second dividing means, the signal R1 applied to the non-inverting input terminal of the second differential amplifier circuit 30b becomes Vsin(x−5), the signal R2 applied to the inverting input terminal of the second differential amplifier circuit 30b becomes 2Vsin(x−2.5). The amplitude of the signal R from the second differential amplifier circuit 30b becomes about V, the phase thereof becomes about 180 degree, the signal R becomes about Vsin(x−180). The relation between the signals R1, R2 and R is shown in FIG. 4.

Figure 5:
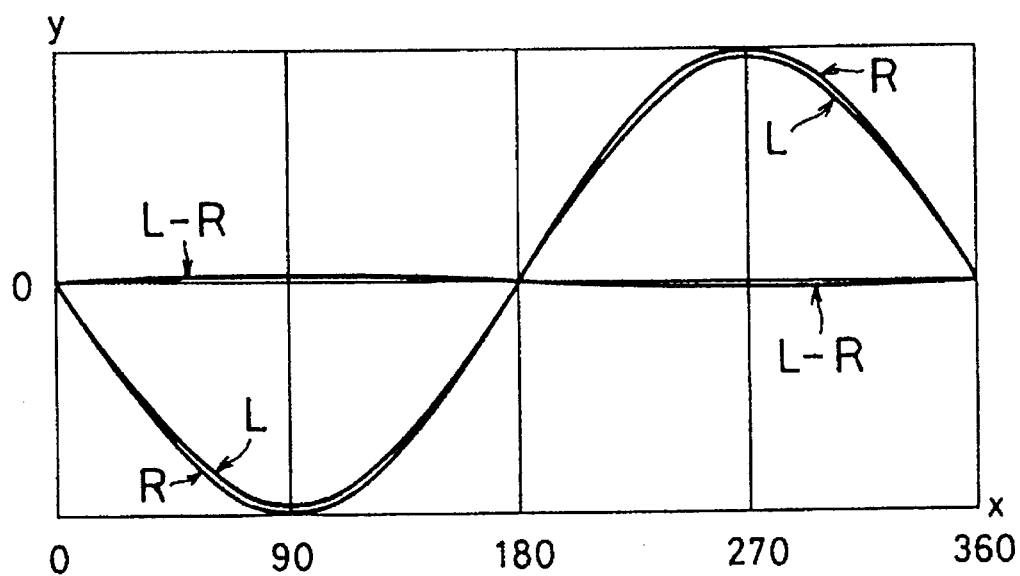
FIG. 5 is a graph showing an example of signals on input sides and an output side of a third differential amplifier circuit caused by the driving signal in the embodiment shown in FIG. 1.

Furthermore, those signals L and R are applied to the non-inverting input terminal and the inverting input terminal of the third differential amplifier circuit 32. Since these signals L and R are similar, the signal L-R from the third differential amplifier circuit 32 becomes about zero. The relation between these signals L, R and L-R is shown in FIG. 5.

Accordingly, in the vibrating gyroscope 10, even if the phase of the driving signal L1 applied to the piezoelectric element 16a and the phase of the driving signal R1 applied to the piezoelectric element 16b are different from each other by changing the atmospheric temperature or environment, for example, as L1=Vsin(x+5) and R1=Vsin(x−5), the signal from the third differential amplifier circuit 32 becomes about zero.

In the vibrating gyroscope 10, even if the phases of the driving signals L1 and R1 applied to the piezoelectric elements 16a and 16b are changed to other phases by changing the atmospheric temperature or environment, since the phases of the signals L2 and R2 are changed in proportion to the changed phases, the signal L from the first differential amplifier circuit 30a and the signal R from the second differential amplifier circuit 30b are hardly changed. Thus, the signal from the third differential amplifier circuit 32 becomes about zero.

Meanwhile, when the driving signals L1 and R1 are the same, the signals L2 and R2 become the same, the signal from the third differential amplifier circuit 32 becomes zero.

As the above-mentioned, in the vibrating gyroscope 10, in association with the driving signals applied to the piezoelectric element 16a and 16b, the signal from the third differential amplifier circuit 32 becomes about zero or less.

In the vibrating gyroscope 10, when the similar driving signals are applied to the two piezoelectric elements 16a and 16b as the above-mentioned, the vibrating body 14 of the piezoelectric vibrator 12 bends and vibrates in the direction perpendicular to the main surface of the piezoelectric element 16c, similar detecting signals are generated on the piezoelectric elements 16a and 16b. In this state, when a rotational angular velocity is applied to the piezoelectric vibrator 12 of the vibrating gyroscope 10 about an axis of the vibrating body 14, the bending and vibrating direction of the vibrating body 14 is changed by a Coriolis force, detecting signals responsive to the rotational angular velocity are generated on the two piezoelectric elements 16a and 16b, respectively. In this case, in response to the magnitude of the rotational angular velocity, for example, a positive phase detecting signal is generated on one piezoelectric element 16a, a negative phase detecting signal is generated on the other piezoelectric element 16b.

Next, it will be described in association with detecting signals generated on the piezoelectric element 16a and 16b of the piezoelectric vibrator 12.

Figure 6:
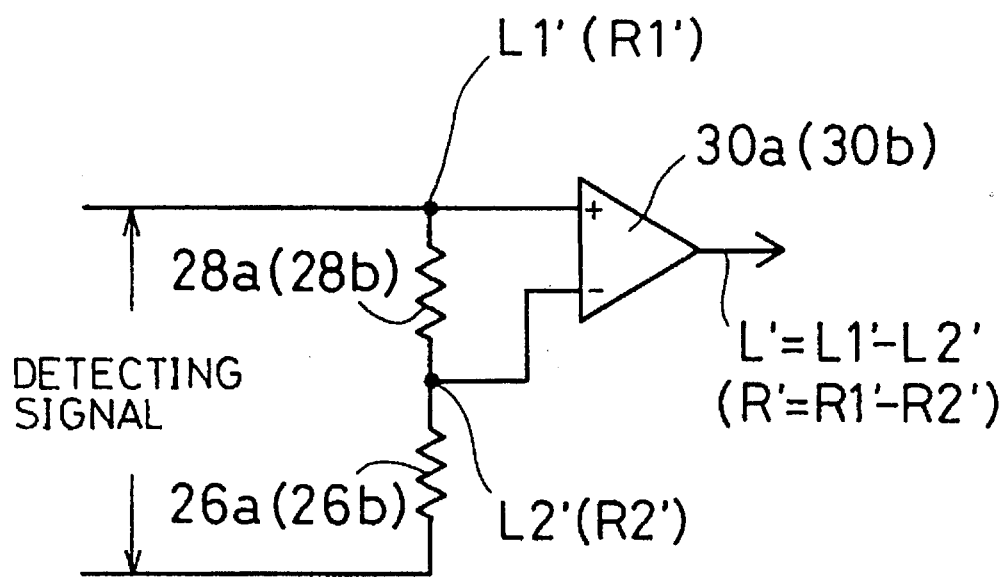
FIG. 6 is a circuit diagram showing signals on the input sides and the output side of the first differential amplifier circuit (the second differential amplifier circuit) caused by a detecting signal in the embodiment shown in FIG. 1.

As shown in FIG. 6, one detecting signal generated on one piezoelectric element 16a is divided into two different signals L1' and L2' at both ends of the resistor 28a of the first dividing means. In this case, since the resistances of the resistors 26a and 28a as the first dividing means are the same, one signal L1' is equal to the detecting signal generated on the piezoelectric element 16a, the other signal L2' is the half of the amplitude of the detecting signal. Meanwhile, those two signals L1' and L2' become the same phase. Those two signals L1' and L2' are applied to the non-inverting input terminal and the inverting input terminal of the first differential amplifier circuit 30a, respectively. Thus, the signal L'=L1'−L2' of the difference between those two signals L1' and L2' is detected by the first differential amplifier circuit 30a. Accordingly, the signal L' from the first differential amplifier circuit 30a becomes the half of one detecting signal generated on the piezoelectric element 16a in proportion to the detecting signal.

Similarly, the other detecting signal generated on the other piezoelectric element 16b is divided into two different signals R1' and R2' at both ends of the resistor 28b of the second dividing means. In this case, since the resistances of the resistors 26b and 28b as the second dividing means are the same, one signal R1' is equal to the detecting signal generated on the piezoelectric element 16b, the other signal R2' is the half of the amplitude of the detecting signal. Meanwhile, those two signals R1' and R2' become the same phase. Those two signals R1' and R2' are applied to the non-inverting input terminal and the inverting input terminal of the second differential amplifier circuit 30b, respectively. Thus, the signal R'=R1'-R2' of the difference between those two signals R1' and R2' is detected by the second differential amplifier circuit 30b. Accordingly, the signal R' from the first differential amplifier circuit 30b becomes the half of the other detecting signal generated on the piezoelectric element 16b in proportion to the detecting signal.

Figure 7:
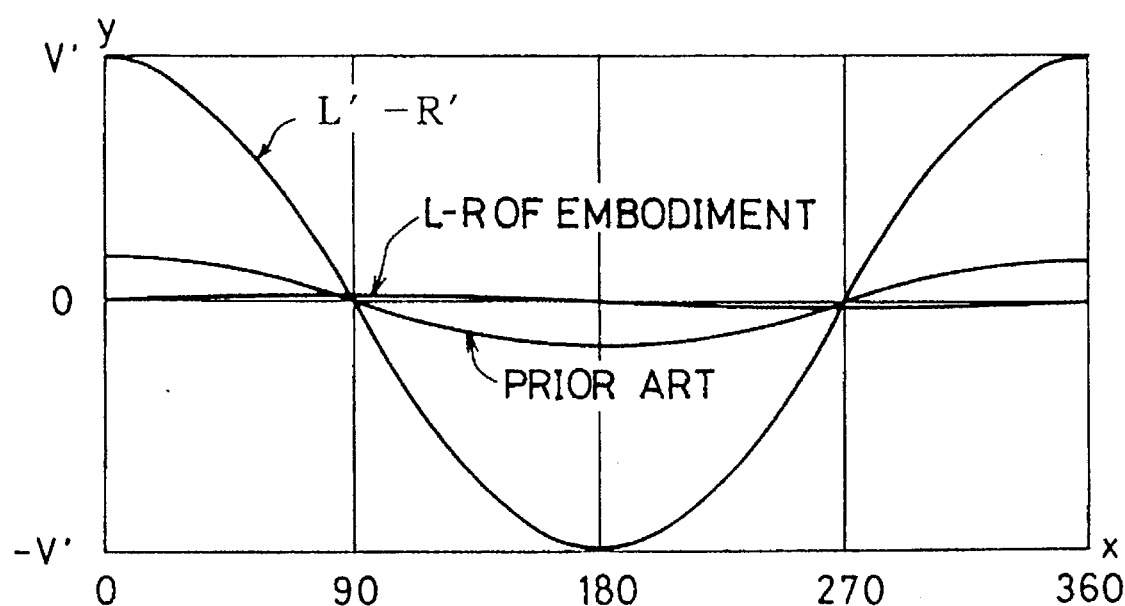
FIG. 7 is a graph showing an example of output signals on the embodiment shown in FIG. 1 and the prior art shown in FIG. 19.

Furthermore, the signal L' from the first differential amplifier circuit 30a and the signal R' from the second differential amplifier circuit 30b are applied to the non-inverting input terminal and the inverting input terminal of the third differential amplifier circuit 32. Thus, the signal L'-R' from the third differential amplifier circuit 32 becomes the signal proportional to the signal of the difference between one detecting signal and the other detecting signal. That is, for example, as shown in FIG. 7, the signal L'-R' from the third differential amplifier circuit 32 becomes the signal proportional to the rotational angular velocity applied to the vibrating gyroscope 10. Meanwhile, since the signal L'-R' is the signal associated with the detecting signals generated on the piezoelectric elements 16a and 16b, the signal has a phase of 90 degree.

As the above-mentioned, in the vibrating gyroscope 10, in association with the detecting signals generated on the piezoelectric elements 16a and 16b, the signal L'-R' from the third differential amplifier circuit 32 becomes the signal proportional to the rotational angular velocity.

On each part of the vibrating gyroscope 10, the signal composed the signal associated with the driving signal and the signal associated with the detecting signal is obtained. Thus, in the vibrating gyroscope 10, even if there is a change of the atmospheric temperature or environment, a drift is suppressed, an output signal nearly proportional to a rotational angular velocity is always obtained from the third differential amplifier circuit 32. That is, as shown in FIG. 7, in the embodiment shown in FIG. 1, compared with the prior art shown in FIG. 19, the signal L-R associated with the driving signals is hardly obtained.

Furthermore, in the vibrating gyroscope 10, the signal from the third differential amplifier circuit 32 is detected in synchronous with the negative part of the signal L'-R' associated with the detecting signals by the first synchronous detection circuit 40a, smoothed by the first smoothing circuit 50a, and amplified by the amplifier circuit 60. Thus, the signal from the amplifier circuit 60 becomes the large signal proportional to the rotational angular velocity. Meanwhile, since there is a phase difference of 90 degree between the signal L'-R' associated with the detecting signals and the signal L-R associated with the driving signals on the signal from the third differential amplifier circuit 32, the signal L-R associated with the driving signals is offset at the positive part and the negative part by the first synchronous detection circuit 40a.

Figure 8:
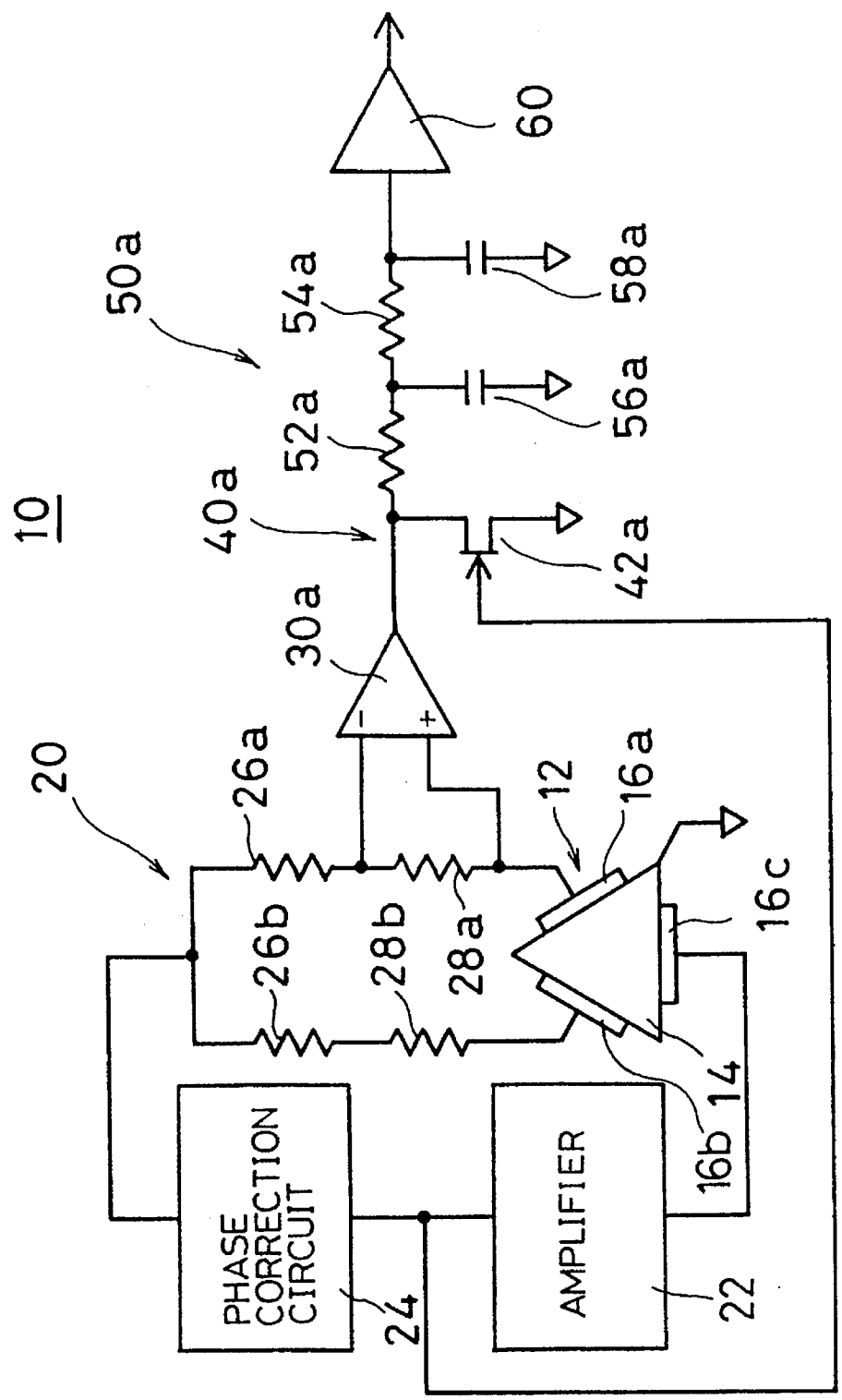
FIG. 8 is a circuit diagram showing another embodiment of the present invention.

FIG. 8 is a circuit diagram showing another embodiment of the present invention. In the embodiment shown in FIG. 8, compared with the embodiment shown in FIG. 1, the second differential amplifier circuit 30b and the third differential amplifier circuit 32 are not used, the output terminal of the first differential amplifier circuit 30a is connected to the input terminal of the first smoothing circuit 50 via the first synchronous detection circuit 40a.

In the vibrating gyroscope 10 shown in FIG. 8, for example, the two piezoelectric elements 16a and 16b of the piezoelectric vibrator 12 are used for driving, the other piezoelectric element 16c is used for feedback. The piezoelectric element 16a is used for detecting, too.

Next, the operation of the embodiment shown in FIG. 8 will be described.

In the embodiment shown in FIG. 8, the piezoelectric vibrator 12, the amplifier 22, the phase correction circuit 24, the resistors 26a, 26b, 28a and 28b, the first differential amplifier circuit 30a operate just like the embodiment shown in FIG. 1.

First, it will be described in association with the driving signals applied to the piezoelectric elements 16a and 16b of the piezoelectric vibrator 12.

It will be described that the phase of the driving signal L1 applied to the piezoelectric element 16a and the phase of the driving signal R1 applied to the piezoelectric element 16b are different from each other by changing the atmospheric temperature or environment, for example, as L1=Vsin(x+5) and R1=Vsin(x-5).

Figure 9:
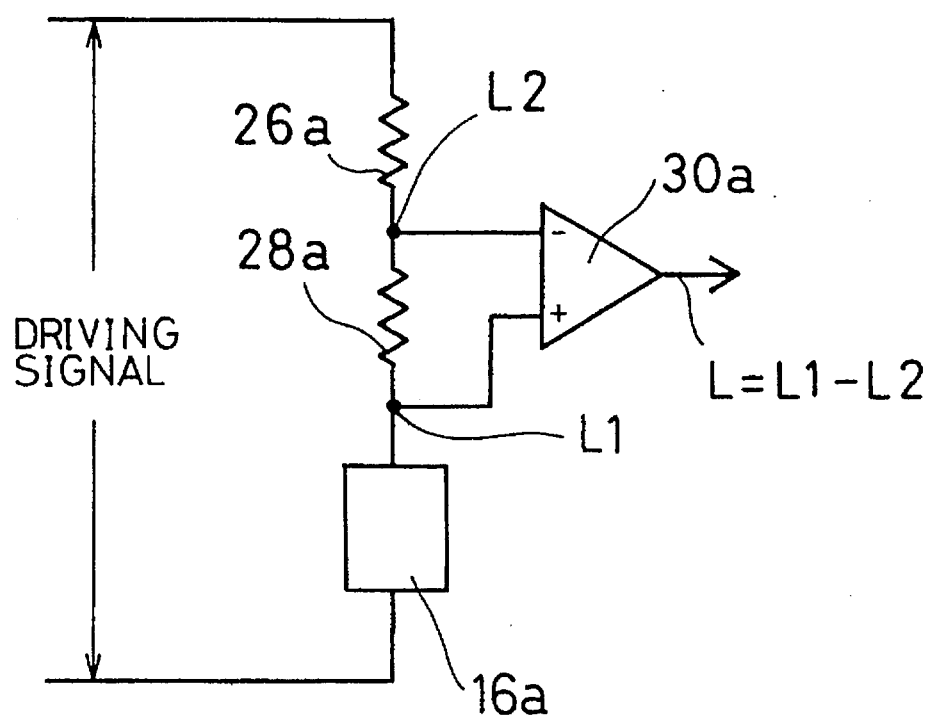
FIG. 9 is a circuit diagram showing signals on input sides and an output side of a first differential amplifier circuit caused by a driving signal in the embodiment shown in FIG. 8.
Figure 10:
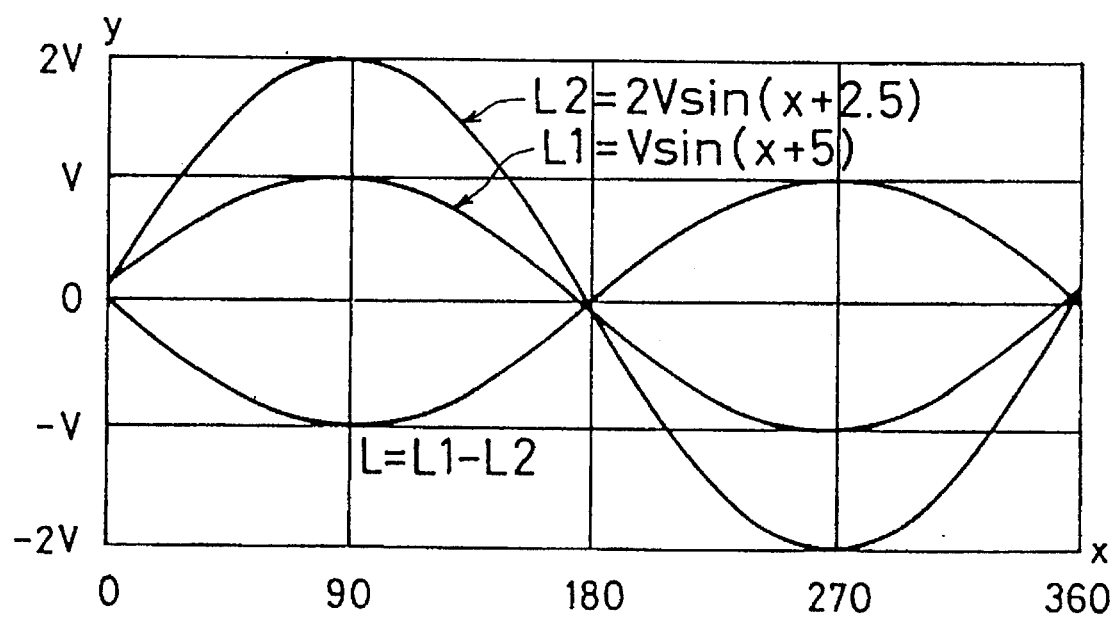
FIG. 10 is a graph showing an example of signals on the input sides and the output side of the first differential amplifier circuit caused by the driving signal in the embodiment shown in FIG. 8.

In the embodiment shown in FIG. 8, just like the embodiment shown in FIG. 1, as shown in FIG. 9, the driving signal on the driving detecting circuit is divided into two different signals L1 and L2 at both ends of the resistor 28a of the first dividing means. Those two signals L1 and L2 are applied to the non-inverting input terminal and the inverting input terminal of the first differential amplifier circuit 30a, respectively. Thus, the signal L=L1-L2 of the difference between those two signals L1 and L2 is detected by the first differential amplifier circuit 30a. In this case, the signal L1 applied to the non-inverting input terminal of the first differential amplifier circuit 30a becomes Vsin(x+5), the signal L2 applied to the inverting input terminal of the first differential amplifier circuit 30a becomes 2Vsin(x+2.5). The magnitude of the signal L from the first differential amplifier circuit 30a becomes about V, the phase thereof becomes about 180 degree, the signal L becomes about Vsin(x-180). The relation between the signals L1, L2 and L is shown in FIG. 10.

Accordingly, in the embodiment shown in FIG. 8, even if the phase of the driving signal L1 applied to the piezoelectric element 16a and the phase of the driving signal R1 applied to the piezoelectric element 16b are different from each other by changing the atmospheric temperature or environment, for example, as L1=Vsin(x+5) and R1=Vsin(x-5), the signal L from the first differential amplifier circuit 30a becomes about Vsin(x-180).

In the embodiment shown in FIG. 8, even if the phase of the driving signal L1 applied to the piezoelectric element 16a is changed to the other phase by changing the atmospheric temperature or environment, since the phase of the signal L2 is changed in proportion to the changed phase, the signal L from the first differential amplifier circuit 30a is hardly changed. Thus, the signal from the first differential amplifier circuit 30a becomes about Vsin(x-180).

As the above mentioned, in the embodiment shown in FIG. 8, in association with the driving signals applied to the piezoelectric elements 16a and 16b, the signal from the first differential amplifier circuit 30a becomes about Vsin(x-180).

Next, the embodiment shown in FIG. 8 will be described in association with the detecting signal generated on the piezoelectric element 16a of the piezoelectric vibrator 12.

Figure 11:
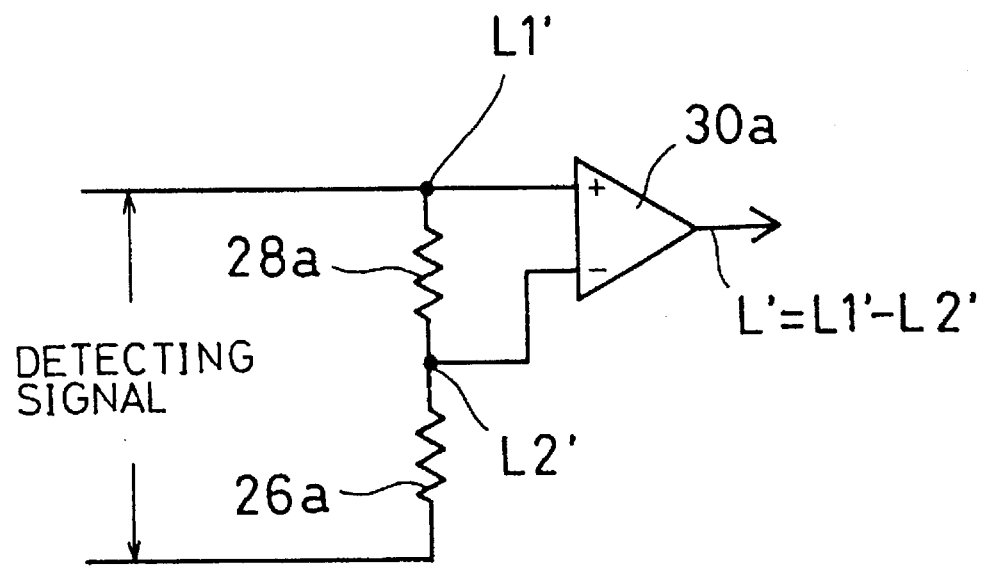
FIG. 11 is a circuit diagram showing signals on the input sides and the output side of the first differential amplifier circuit caused by a detecting signal in the embodiment shown in FIG. 8.
Figure 12:
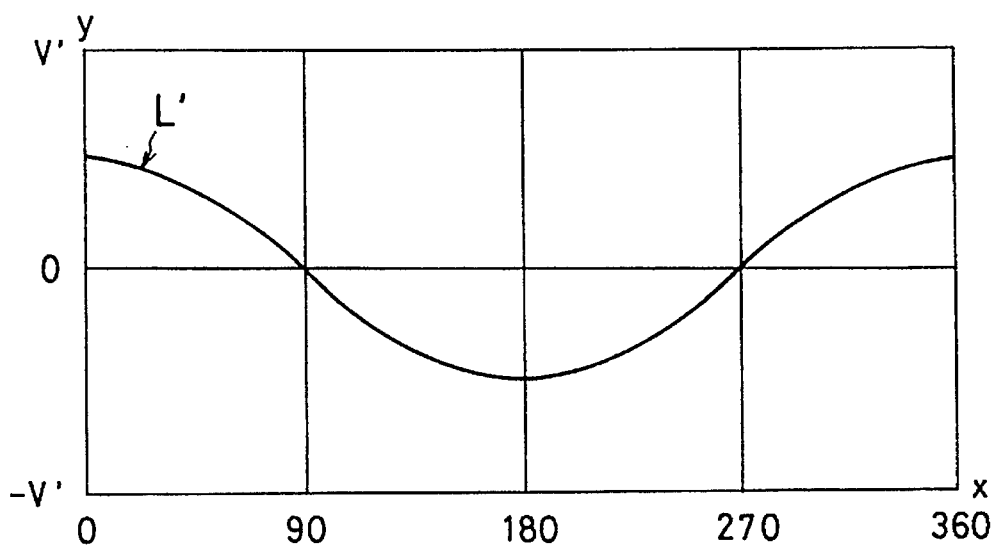
FIG. 12 is a graph showing an example of a signal on the output side of the first differential amplifier circuit caused by the detecting signal in the embodiment shown in FIG. 8.

In the embodiment shown in FIG. 8, just like the embodiment shown in FIG. 1, as shown in FIG. 11, the detecting signal generated on the piezoelectric element 16a is divided into two different signal L1' and L2' at both ends of the resistor 28a of the first dividing means. Those two signals L1' and L2' are applied to the non-inverting input terminal and the inverting input terminal of the first differential amplifier circuit 30a, respectively. Thus, the signal L'=L1'–L2' of the difference between those two signal L1' and L2' is detected by the first differential amplifier circuit 30a. Accordingly, the signal L' from the first differential amplifier circuit 30a becomes the half of the signal proportional to the detecting signal generated on the piezoelectric element 16a. Meanwhile, since the signal L' is the signal associated with the detecting signal generated on the piezoelectric element 16a, for example, the signal L' has a phase of 90 degree as shown in FIG. 12.

As the above-mentioned, in the embodiment shown in FIG. 8, in association with the detecting signal generated on the piezoelectric element 16a, the signal L' from the first differential amplifier circuit 30a becomes the signal proportional to the rotational angular velocity.

Figure 13:
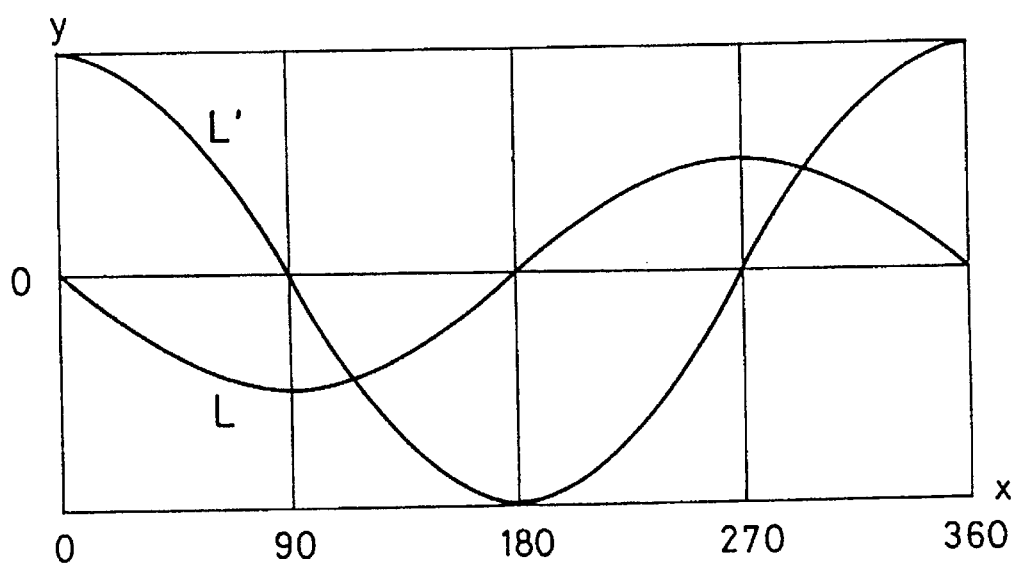
FIG. 13 is a graph showing an example of each signal on the output side of the first differential amplifier circuit caused by the driving signal and the detecting signal in the embodiment shown in FIG. 8.

In the embodiment shown in FIG. 8, from the output terminal of the first differential amplifier circuit 30a, the signal composed the signal L associated with the driving signal and the signal L' associated with the detecting signal is obtained. In this case, as shown in FIG. 13, there is a phase difference of 90 degree between those signals L and L'.

The signal from the first differential amplifier circuit 30a is detected in synchronous with the negative part of the signal L' associated with the detecting signal by the first synchronous detection circuit 40a, smoothed by first smoothing circuit 50a. Thus, on the signal from the first differential amplifier circuit 30a, the signal L associated with the driving signal is offset at the positive part and the negative part. Accordingly, the signal from the first smoothing circuit 50a becomes the signal proportional to the detecting signal, that is, the signal proportional to the applied rotational angular velocity. The signal from the first smoothing circuit 50a is amplified by the amplifier circuit 60. Thus, the signal from the amplifier circuit 60 becomes the large signal proportional to the rotational angular velocity.

As the above-mentioned, in the embodiment shown in FIG. 8, when there is a change of the atmospheric temperature or environment, since the signal associated with the driving signal is offset, a drift is suppressed, an output signal nearly proportional to a rotational angular velocity is always obtained from the first smoothing circuit 50a or the amplifier circuit 60.

Figure 14:
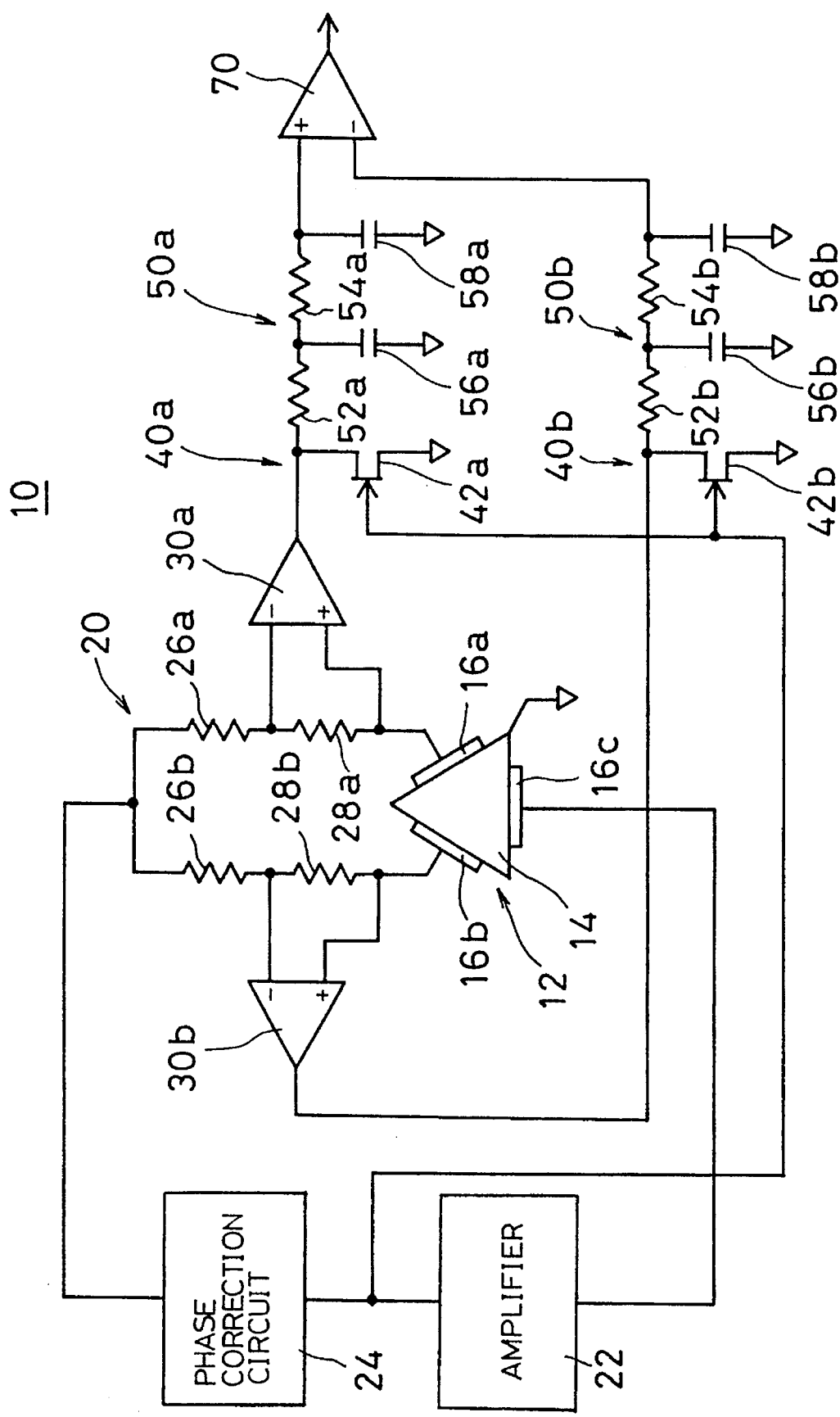
FIG. 14 is a circuit diagram showing still another embodiment of the present invention.

FIG. 14 is a circuit diagram showing still another embodiment of the present invention. In the embodiment shown in FIG. 14, compared with the embodiment shown in FIG. 8, the resistors 26b and 28b are used as a second dividing means. Though the other driving detecting circuit is constituted with the second dividing means, the amplifier 22, the phase correction circuit 24 and so on, the second dividing means is for dividing the signal on the driving detecting circuit into two signals which are different levels.

Both ends of one resistor 28b of the second dividing means are connected to a non-inverting input terminal and an inverting input terminal of a second differential amplifier circuit 30b as a second detecting means, respectively. The second detecting means is for detecting the signal of the difference between the two signals divided by the second dividing means.

Furthermore, an output terminal of the second differential amplifier circuit 30b is connected to an input terminal of a second smoothing circuit 50b via a second synchronous detection circuit 40b. The second synchronous detection circuit 40b is for detecting the signal from the second differential amplifier circuit 30b in synchronous with the detecting signal. The second synchronous detection circuit 40b includes, for example, an FET 42b as a switching element. The output terminal of the second differential amplifier circuit 30b is connected to a drain of the FET 42b, the half of the electric potential of the power supply voltage Vcc is applied to a source of the FET 42b. The output terminal of the amplifier 22 is connected to a gate of the FET 42b.

The second smoothing circuit 50b is for smoothing the signal from the second synchronous detection circuit 40b. The second smoothing circuit 50b is constituted with two resistors 52b and 54b and two capacitors 56b and 58b.

Furthermore, the output terminal of the first smoothing circuit 50a and the output terminal of the second smoothing circuit 50b are connected to a non-inverting input terminal and an inverting input terminal of a third differential amplifier circuit 70 as a composite means. The third differential amplifier circuit 70 is for composing the signal from the first smoothing circuit 50a and the signal from the second smoothing circuit 50b and detecting the signal of the difference between those signals.

Next, the operation of the embodiment shown in FIG. 14 will be described.

Roughly, in the embodiment shown in FIG. 14, the piezoelectric vibrator 12, the amplifier 22, the phase correction circuit 24, the resistors 26a and 28a as the first dividing means, the first differential amplifier circuit 30a, the first synchronous detection circuit 40a, the first smoothing circuit 50a operate just like the embodiment shown in FIG. 8, compared with the embodiment shown in FIG. 8, the resistors 26b and 28b as the second dividing means, the second differential amplifier circuit 30b, the second synchronous detection circuit 40b, the second smoothing circuit 50b and the third differential amplifier circuit 70 operate newly.

The embodiment shown in FIG. 14 will be described in association with the driving signals applied to the piezoelectric elements 16a and 16b of the piezoelectric vibrator 12.

It will be described that the phase of the driving signal L1 applied the piezoelectric element 16a and the phase of the driving signal R1 applied to the piezoelectric element 16b are different from each other by changing the atmospheric temperature or environment, for example, as L1=Vsin(x+5) and R1=Vsin(x−5).

In the embodiment shown in FIG. 14, just like the embodiment shown in FIG. 8, the driving signal on one driving detecting circuit is divided into two different signals L1 and L2 at both ends of the resistor 28a of the first dividing means. Those two signals L1 and L2 are applied to the non-inverting input terminal and the inverting input terminal of the first differential amplifier circuit 30a, respectively. Thus, the signal L=L1−L2 of the difference between those two signals L1 and L2 is detected by the first differential amplifier circuit 30a. In this case, the signal L1 applied to the non-inverting input terminal of the first differential amplifier circuit 30a becomes Vsin(x+5), the signal L2 applied to the inverting input terminal of the first differential amplifier circuit 30a becomes 2Vsin(x+2.5). The magnitude of the signal L from the first differential amplifier circuit 30a becomes about V, the phase thereof becomes about 180 degree, the signal L becomes about Vsin(x−180).

Similarly, the driving signal on the other driving detecting circuit is divided into two different signals R1 and R2 at both ends of the resistor 28b of the second dividing means. In this case, the signal R1 is equal to the driving signal applied to the piezoelectric element 16b. Since the resistances of the resistors 26b and 28b of the second dividing means are the same, the voltage of the signal R2 becomes the double of the voltage of the signal R1, the phase thereof becomes the half of the phase of the signal R1. Those two signals R1 and R2 are applied to the non-inverting input terminal and the inverting input terminal of the second differential amplifier circuit 30b, respectively. Thus, the signal R=R1−R2 of the difference between those two signals R1 and R2 is detected by the second differential amplifier circuit 30b. In this case, the signal R1 applied to the non-inverting input terminal of the second differential amplifier circuit 30b becomes Vsin(x−5), the signal R2 applied to the inverting input terminal of the second differential amplifier circuit 30b becomes 2Vsin(x−2.5). The magnitude of the signal R from the second differential amplifier circuit 30b becomes about V, the phase thereof becomes about 180 degree, the signal R becomes about Vsin(x−180).

In the embodiment shown in FIG. 14, just like the embodiment shown in FIG. 8, the signal L from the first differential amplifier circuit 30a is synchronously detected by the first synchronous detection circuit 40a, thereafter, is smoothed by the first smoothing circuit 50a. Thus, the signal L associated with the driving signal on one driving detecting circuit is offset at the positive part and the negative part.

Similarly, the signal R from the second differential amplifier circuit 30b is synchronously detected by the second synchronous detection circuit 40b, thereafter, is smoothed by the second smoothing circuit 50b. Thus, the signal R associated with the driving signal on the other driving detecting circuit is offset at the positive part and the negative part, too.

The signal from the first smoothing circuit 50a and the signal from the second smoothing circuit 50b are composed by the third differential amplifier circuit 70, the signal of the difference between those signals is detected. In this case, since the signals L and R associated with the driving signals on both driving detecting circuits are offset similarly, the signal associated with the driving signal on the driving detecting circuit from the third differential amplifier circuit 70 becomes about zero.

Accordingly, in the embodiment shown in FIG. 14, even if the phase of the driving signal L1 applied to the piezoelectric element 16a and the phase of the driving signal R1 applied to the piezoelectric element 16b are different from each other by changing the atmospheric temperature or environment, for example, as L1=Vsin(x+5) and R1=Vsin(x−5), the signal from the third differential amplifier circuit 70 becomes about zero.

In the embodiment shown in FIG. 14, even if the phases of the driving signals L1 and R1 applied to the piezoelectric elements 16a and 16b are changed to the other phases by changing the atmospheric temperature or environment, since the phases of the signals L2 and R2 are changed in proportion to the changed phases, the signal L from the first differential amplifier circuit 30a and the signal R from the second differential amplifier circuit 30b are hardly changed. Thus, the signal from the third differential amplifier circuit 70 becomes about zero.

Meanwhile, when the driving signals L1 and R1 are the same, the signals L2 and R2 are the same, the signal from the third differential amplifier circuit 70 becomes zero.

As the above-mentioned, in the embodiment shown in FIG. 14, in association with the driving signals applied to the piezoelectric elements 16a and 16b, the signal from the third differential amplifier circuit 70 becomes about zero.

Next, the embodiment shown in FIG. 14 will be described in association with the detecting signals generated on the piezoelectric elements 16a and 16b of the piezoelectric vibrator 12.

In the embodiment shown in FIG. 14, just like the embodiment shown in FIG. 8, one detecting signal generated on one piezoelectric element 16a is divided into two different signals L1' and L2' at both ends of the resistor 28a of the first dividing means. Those two signals L1' and L2' are applied to the non-inverting input terminal and the inverting input terminal of the first differential amplifier circuit 30a, respectively. Thus, the signal L'=L1'−L2' of the difference between those two signals L1' and L2' is detected by the first differential amplifier circuit 30a. Accordingly, the signal L' from the first differential amplifier circuit 30a becomes the half of the signal proportional to one detecting signal generated on the piezoelectric element 16a.

Similarly, the other detecting signal generated on the other piezoelectric element 16b is divided into two different signals R1' and R2' at both ends of the resistor 28b of the second dividing means. In this case, since the resistances of the resistors 26b and 28b of the second dividing means are the same, one signal R1' is equal to the detecting signal generated on the piezoelectric element 16b, the other signal R2' becomes the half of the detecting signal. Meanwhile, those two signals R1' and R2' are the same phase. Those two signals R1' and R2' are applied to the non-inverting input terminal and the inverting input terminal of the second differential amplifier circuit 30b, respectively. Thus, the signal R'=R1'−R2' of the difference between those two signal R1' and R2' is detected by the second differential amplifier circuit 30b. Accordingly, the signal R' from the second differential amplifier circuit 30b becomes the half of the signal proportional to the other detecting signal generated on the piezoelectric element 16b.

Meanwhile, since one detecting signal generated on one piezoelectric element 16a and the other detecting signal generated on the other piezoelectric element 16b become reverse phases, the signal L' from the first differential amplifier circuit 30a and the signal R' from the second differential amplifier circuit 30b are reverse phases.

The signal L' from the first differential amplifier circuit 30a, just like the embodiment shown FIG. 8, is synchronously detected by the first synchronous detection circuit 40a, thereafter, is smoothed by the first smoothing circuit 50a. Thus, the signal from the first smoothing circuit 50a becomes the signal proportional to one detecting signal, that is, the signal proportional to the applied rotational angular velocity.

Similarly, the signal R' from the second differential amplifier circuit 30b is synchronously detected by the second synchronous detection circuit 40b, thereafter, is smoothed by the second smoothing circuit 50b. Thus, the signal from the second smoothing circuit 50b becomes the signal proportional to the other detecting signal, that is, the signal proportional to the applied rotational angular velocity.

Meanwhile, since the signal L' from the first differential amplifier circuit 30a and the signal R' from the second differential amplifier circuit 30b are reverse phases, the signal from the first smoothing circuit 50a and the signal from the second smoothing circuit 50b are reverse phases.

The signal from the first smoothing circuit 50a and the signal from the second smoothing circuit 50b are applied to the non-inverting input terminal and the inverting input terminal of the third differential amplifier circuit 70, respectively. Thus, the signal from the third differential amplifier circuit 70 becomes the signal proportional to the signal of the difference between one detecting signal and the other detecting signal. That is, the signal from the third differential amplifier circuit 70 becomes the large signal proportional to the rotational angular velocity applied to the vibrating gyroscope 10.

Figure 15:
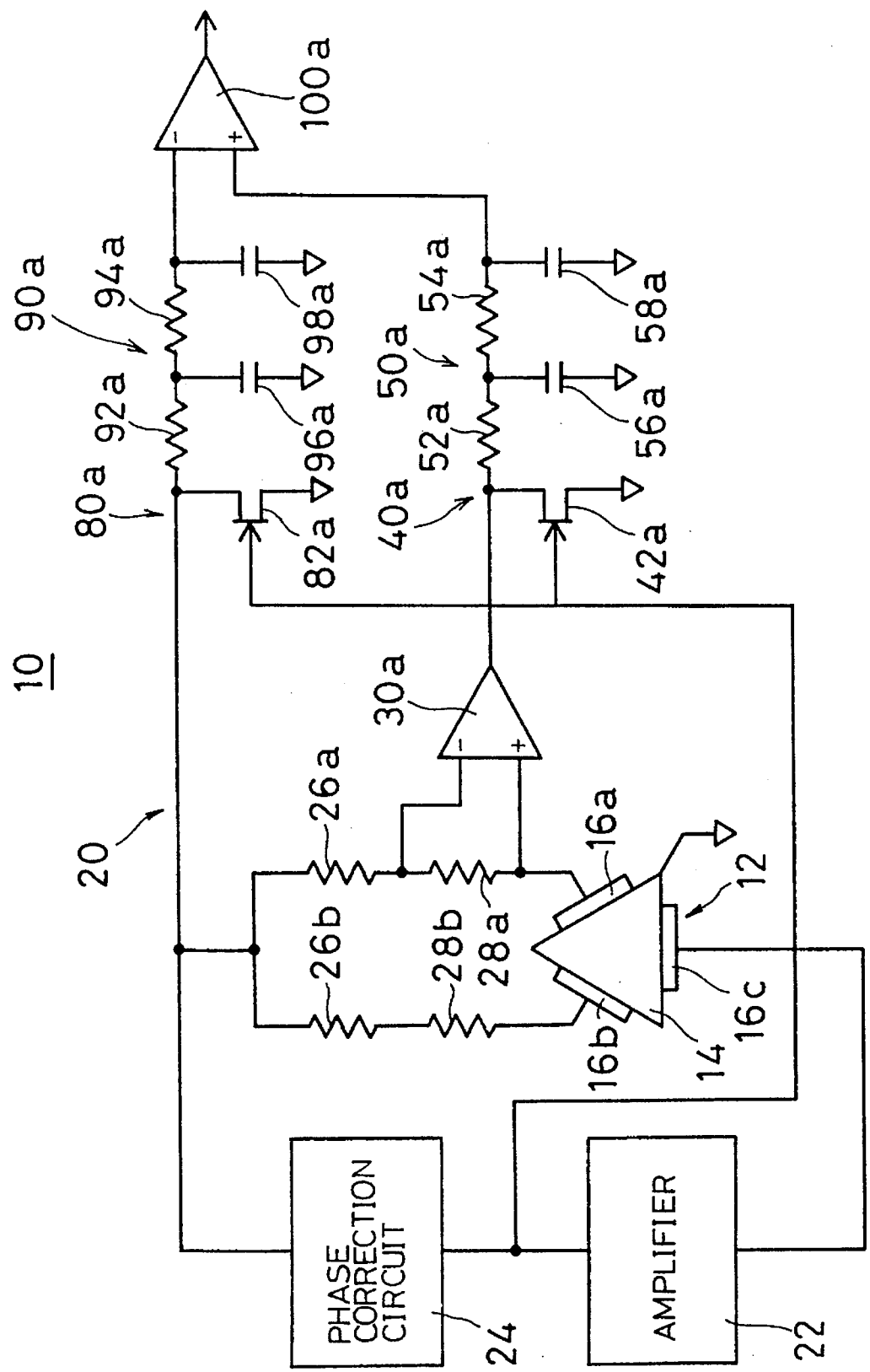
FIG. 15 is a circuit diagram showing a modification of the embodiment shown in FIG. 8.

FIG. 15 is a circuit diagram showing a modification of the embodiment shown in FIG. 8. In the embodiment shown in FIG. 15, compared with the embodiment shown in FIG. 8, a synchronous detection circuit 80a as a second synchronous detection means, a smoothing circuit 90a as a second smoothing means and a differential amplifier 100a as a composite means are used.

The synchronous detection circuit 80a is for detecting the signal associated with the driving signal in synchronous with the detecting signal. The synchronous detection circuit 80a includes, for example, an FET 82a as a switching element, the output terminal of the phase correction circuit 24 is connected to a drain of the FET 82a, the half of the electric potential of the power supply voltage Vcc is applied to a source of the FET 82a. The output terminal of the amplifier 22 is connected to a gate of the FET 82a.

The smoothing circuit 90a is for smoothing the signal from the synchronous detection circuit 80a. The smoothing circuit 90a is constituted with two resistors 92a and 94a and two capacitors 96a and 98a, too.

The differential amplifier 100a is for composing the signal from the first smoothing circuit 50a and the signal from the smoothing circuit 90a and detecting the difference between those signals. The output terminal of the first smoothing circuit 50a and the output terminal of the smoothing circuit 90a are connected to a non-inverting input terminal and an inverting input terminal of the differential amplifier 100a, respectively.

Next, the operation of the embodiment shown in FIG. 15 will be described.

In the embodiment shown in FIG. 15, the piezoelectric vibrator 12, the amplifier 22, the phase correction circuit 24, the resistors 26a and 28a as the first dividing means, the first differential amplifier circuit 30a, the first synchronous detection circuit 40a and the first smoothing circuit 50a operate just like the embodiment shown in FIG. 8. Thus, the signal from the first smoothing circuit 50a becomes the signal composed the signal offset the signal associated with the driving signal and the signal proportional to the rotational angular velocity.

In the embodiment shown in FIG. 15, the signal associated with the driving signal is detected in synchronous with the detecting signal by the the synchronous detection circuit 80a, and is smoothed by the smoothing circuit 90a. Thus, the signal from the smoothing circuit 90a becomes the signal offset the signal associated with the driving signal.

Furthermore, in the embodiment shown in FIG. 15, by the differential amplifier 100a, the signal from the first smoothing circuit 50a and the signal from the smoothing circuit 90a are composed, the signal of the difference between those signals is detected. Accordingly, even if the signal associated with the driving signal is not offset enough on the signal from the first smoothing circuit 50a, the signal from the differential amplifier 100a becomes the signal proportional to the rotational angular velocity wherein the signal associated with the driving signal is offset enough.

Figure 16:
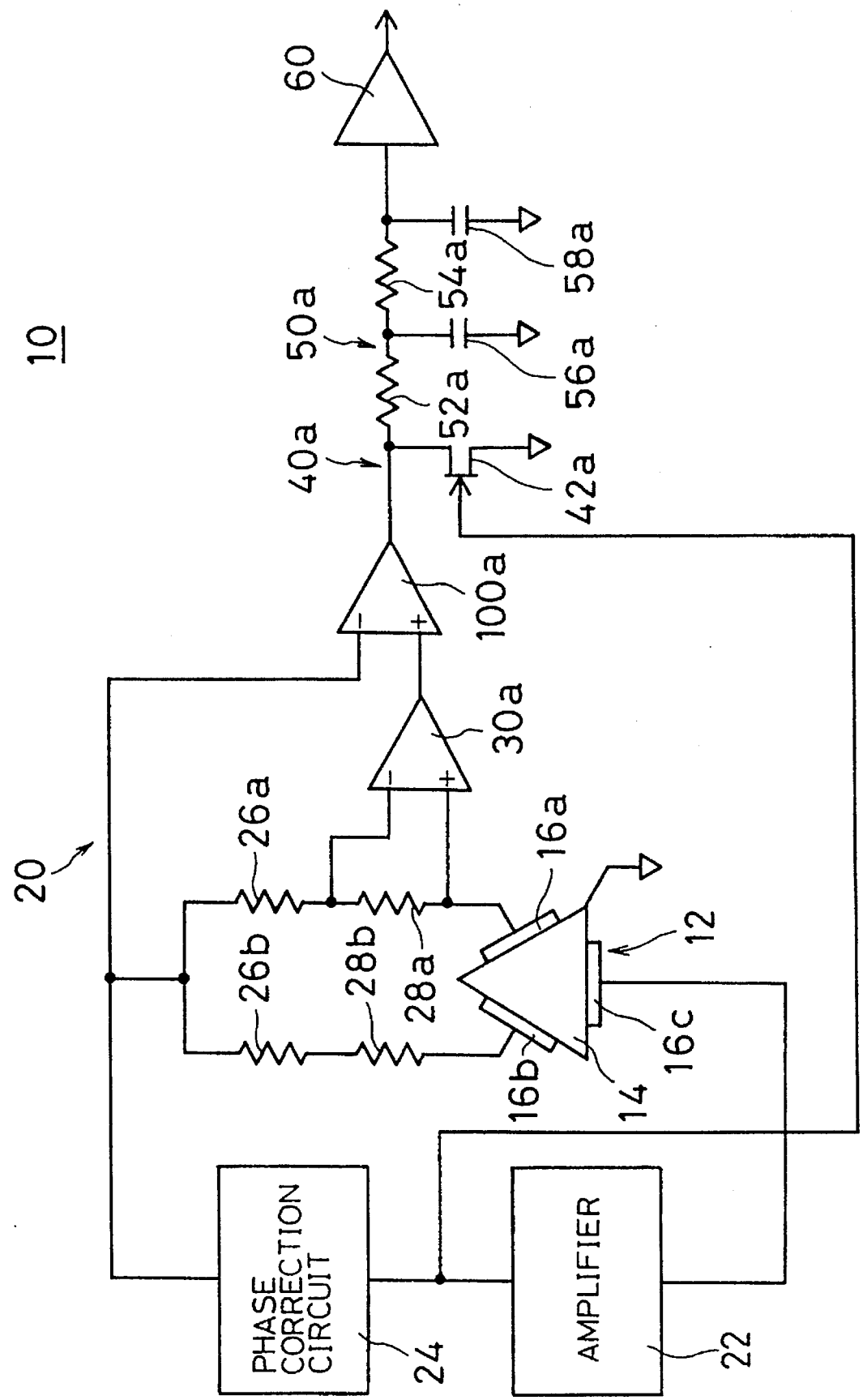
FIG. 16 is a circuit diagram showing another modification of the embodiment shown in FIG. 8.

FIG. 16 is a circuit diagram showing another modification of the embodiment shown in FIG. 8. In the embodiment shown in FIG. 16, compared with the embodiment shown FIG. 8, a differential amplifier 100a as a composite means is used. The differential amplifier 100a is for composing the signal from the first differential amplifier circuit 30a and the signal associated with the driving signal from the phase correction circuit 24 and detecting the difference between those signals. Thus, the output terminal of the first differential amplifier circuit 30a and the output terminal of the phase correction circuit 24 are connected to a non-inverting input terminal and an inverting input terminal of the differential amplifier 100a, respectively, an output terminal of the differential amplifier 100a is connected to the input terminal of the first smoothing circuit 50a via the first synchronous detection circuit 40a. In the embodiment shown in FIG. 16, compared with the embodiment shown in FIG. 8, the signal associated with the driving signal on the signal from the first differential amplifier circuit 30a is offset by the differential amplifier 100a prior to the first smoothing circuit 50a, too.

Figure 17:
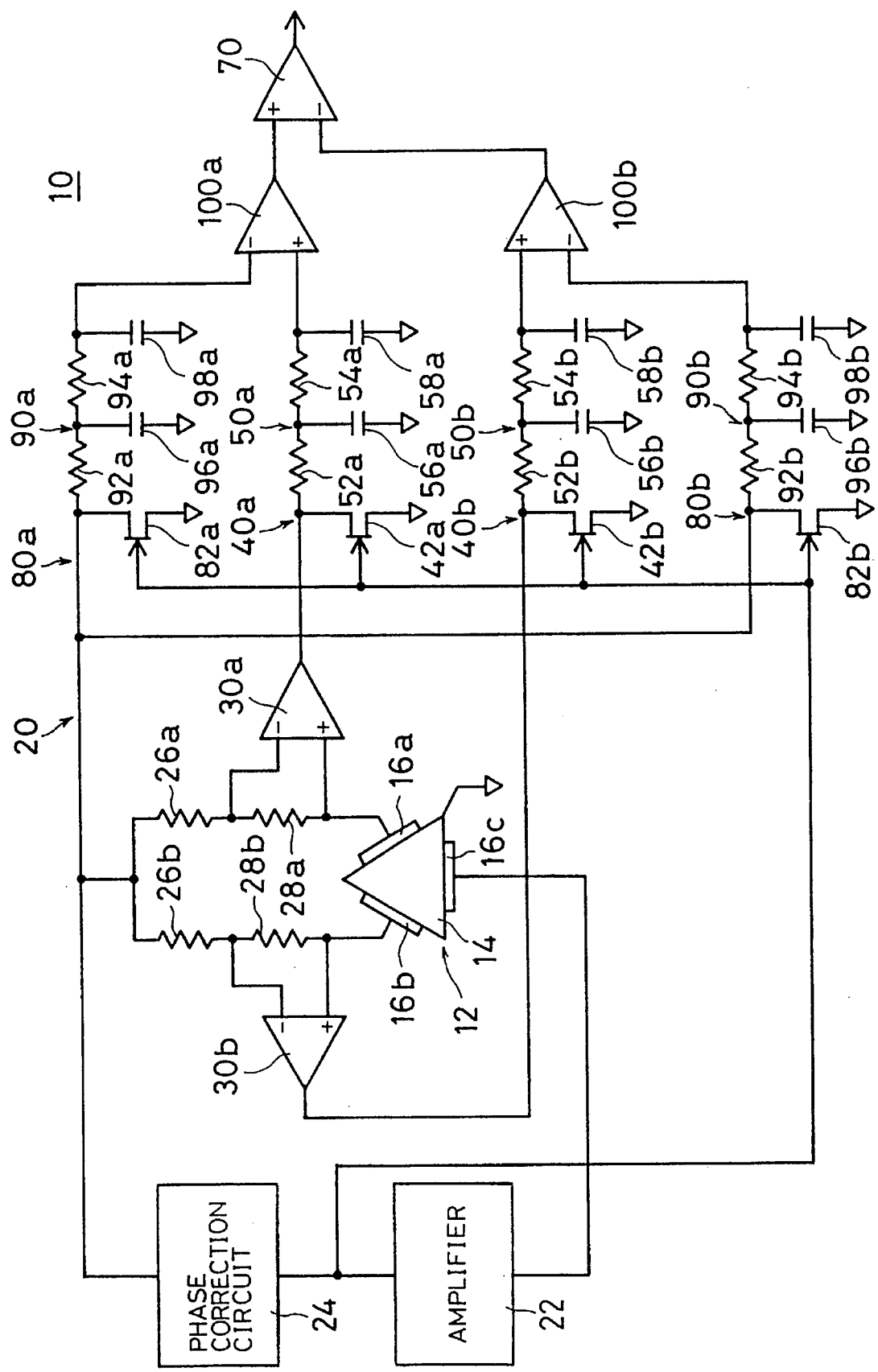
FIG. 17 is a circuit diagram showing a modification of the embodiment shown in FIG. 14.

FIG. 17 is a circuit diagram showing a modification of the embodiment shown in FIG. 14. In the embodiment shown in FIG. 17, compared with the embodiment shown in FIG. 14, two synchronous detection circuits 80a and 80b as a third and a fourth synchronous detection means, two smoothing circuits 90a and 90b as a third and a fourth smoothing means and two differential amplifiers 100a and 100b as a second and a third composite means are used.

The third and the fourth synchronous detection circuits 80a and 80b are for detecting the signal associated with the driving signal in synchronous with the detecting signal, respectively. These synchronous detection circuits 80a and 80b include, for example, an FET 82a and an FET 82b as a switching element, the output terminal of the phase correction circuit 24 is connected to a drain of the FET 82a and a drain of the FET 82b, the half of the electric potential of the power supply voltage Vcc is applied to a source of the FET 82a and a source of the FET 82b. Also, the output terminal of the amplifier 22 is connected to a gate of the FET 82a and a gate of the FET 82b.

The third and the fourth smoothing circuits 90a and 90b are for smoothing the signals from the third and the fourth synchronous detection circuits 80a and 80b, respectively. The third smoothing circuit 90a is constituted with two resistors 92a and 94a and two capacitors 96a and 98a, the fourth smoothing circuit 90b is constituted with two resistors 92b and 94b and two capacitors 96b and 98b, too.

The differential amplifier 100a is for composing the signal from the first smoothing circuit 50a and the signal from the third smoothing circuit 90a and detecting the difference between those signals. The output terminal of the first smoothing circuit 50a and the output terminal of the third smoothing circuit 90a are connected to a non-inverting input terminal and an inverting input terminal of the differential amplifier 100a, respectively.

The differential amplifier 100b is for composing the signal from the second smoothing circuit 50b and the signal from the fourth smoothing circuit 90b and detecting the difference between those signals. The output terminal of the second smoothing circuit 50b and the output terminal of the fourth smoothing circuit 90b are connected to a non-inverting input terminal and an inverting input terminal of the differential amplifier 100b, respectively. Meanwhile, output terminals of the differential amplifiers 100a and 100b are connected to the non-inverting input terminal and the inverting input terminal of the differential amplifier circuit 70, respectively.

Next, the operation of the embodiment shown in FIG. 17 will be described.

In the embodiment shown in FIG. 17, the piezoelectric vibrator 12, the amplifier 22, the phase correction circuit 24, the resistors 26a and 28a as the first dividing means, the resistors 26b and 28b as the second dividing means, the first differential amplifier circuit 30a, the second differential amplifier circuit 30b, the first synchronous detection circuit 40a, the second synchronous detection circuit 40b, the first smoothing circuit 50a and the second smoothing circuit 50b operate just like the embodiment shown in FIG. 14. Accordingly, the signal from the first smoothing circuit 50a becomes the signal composed the signal offset the signal associated with the driving signal and for example the positive phase signal proportional to the rotational angular velocity. The signal from the second smoothing circuit 50b becomes the signal composed the signal offset the signal associated with the driving signal and for example the negative phase signal proportional to the rotational angular velocity.

In the embodiment shown in FIG. 17, the signals associated with the driving signals are detected in synchronous with the detecting signals by the third and the fourth synchronous detection circuits 80a and 80b, and are smoothed by the third and the fourth smoothing circuits 90a and 90b, respectively. Thus, the signals from the third and the fourth smoothing circuits 90a and 90b become the signals offset the signals associated with the driving signals, respectively.

Furthermore, in the embodiment shown in FIG. 17, by the differential amplifier 100a, the signal from the first smoothing circuit 50a and the signal from the third smoothing circuit 90a are composed, the signal of the difference between those signals is detected. Accordingly, even if the signal associated with the driving signal on the signal from the first smoothing circuit 50a is not offset enough, the signal from the differential amplifier 100a becomes, for example, the positive phase signal proportional to the rotational angular velocity offset the signal associated with the driving signal.

In the embodiment shown in FIG. 17, by the differential amplifier 100b, the signal from the second smoothing circuit 50b and the signal from the fourth smoothing circuit 90b are composed, the signal of the difference between those signals is detected. Accordingly, even if the signal associated with the driving signal on the signal from the second smoothing circuit 50b is not offset enough, the signal from the differential amplifier 100b becomes, for example, the negative phase signal proportional to the rotational angular velocity offset the signal associated with the driving signal.

Accordingly, in the embodiment shown in FIG. 17, compared with the embodiment shown in FIG. 14, even if the signals associated with the driving signals on the signals from the first and the second smoothing circuits 50a and 50b are not offset enough, the signal from the differential amplifier 70 becomes the large signal proportional to the rotational angular velocity offset the signals associated with the driving signals.

Figure 18:
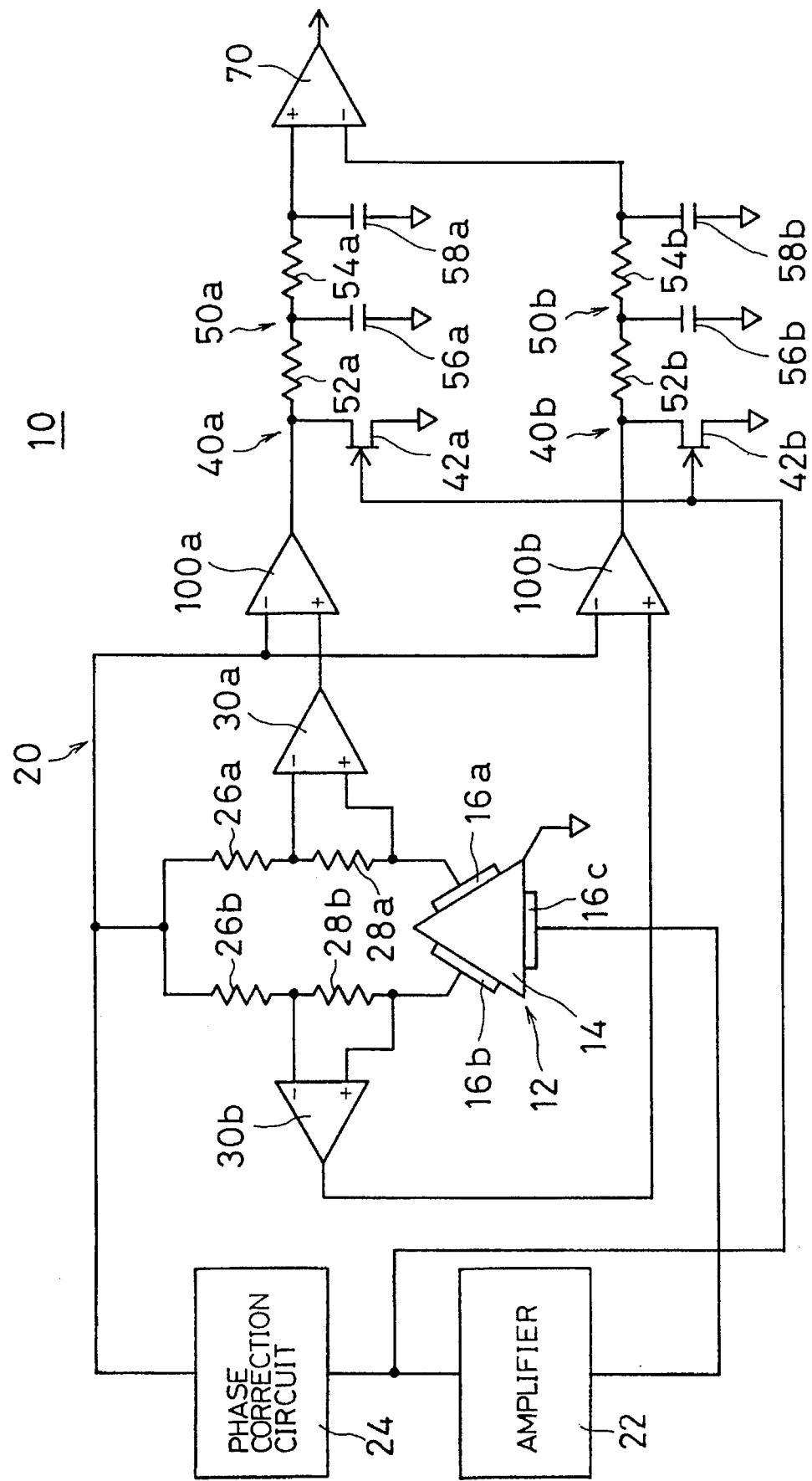
FIG. 18 is a circuit diagram showing another modification of the embodiment shown in FIG. 14.

FIG. 18 is a circuit diagram showing another modification of the embodiment shown in FIG. 14. In the embodiment shown in FIG. 18, compared with the embodiment shown in FIG. 14, two differential amplifiers 100a and 100b as a second and a third composite means are used. The differential amplifier 100a is for composing the signal from the first differential amplifier circuit 30a and the signal associated with the driving signal from the phase correction circuit 24 and detecting the difference between those signals. Thus, the output terminal of the first differential amplifier circuit 30a and the output terminal of the phase correction circuit 24 are connected to a non-inverting input terminal and an inverting input terminal of the differential amplifier 100a, respectively, an output terminal of the differential amplifier 100a is connected to the input terminal of first smoothing circuit 50a via the first synchronous detection circuit 40a. The differential amplifier 100b is for composing the signal from the second differential amplifier circuit 30b and the signal associated with the driving signal from the phase correction circuit 24 and detecting the difference between those signals. Thus, the output terminal of the second differential amplifier circuit 30b and the output terminal of the phase correction circuit 24 are connected to a non-inverting input terminal and an inverting input terminal of the differential amplifier 100b, respectively, an output terminal of the differential amplifier 100b is connected to the input terminal of the second smoothing circuit 50b via the second synchronous detection circuit 40b. In the embodiment shown in FIG. 18, compared with the embodiment shown in FIG. 14, the signals associated with the driving signals on the signals from the first differential amplifier circuit 30a and the second differential amplifier circuit 30b are respectively offset by the differential amplifiers 100a and 100b prior to the first and the second synchronous detection circuits 40a and 40b, too.

Meanwhile, in the above-mentioned each embodiment, though the ratio of the resistances of the resistors 26a and 28a is a ratio of 1 to 1 and the ratio of the resistances of the resistors 26b and 28b is a ratio of 1 to 1, those ratios may be changed to the other ratios excepting a ratio of 1 to 1. Furthermore, the resistors 26a and 26b may be replaced with conductors, respectively.

In the above-mentioned each embodiment, though the piezoelectric vibrator has the regular triangular prism-shaped vibrating body and the three piezoelectric elements formed on the surface thereof, the present invention may be applied to another vibrating gyroscope having one or more driving detecting circuit.

It will be apparent from the foregoing that, while the present invention has been described in detail and illustrated, these are only particular illustrations and examples, and the present invention is not limited to these. The spirit and scope of the present invention is limited only by the appended claims.

What is claimed is:

1. A vibrating gyroscope having two driving detecting circuit driven by a driving means comprising:

a first dividing means, connected to one of said two driving detecting circuits, for dividing a signal from one of said two driving detecting circuits into a first pair of signals which have different levels;

a first differential means, connected to said first dividing means, for detecting a signal of a difference between said first pair of signals divided by said first dividing means;

a second dividing means, connected to the other of the two driving detecting circuits, for dividing a signal from the other of said two driving detecting circuits into a second pair of signals which have different levels;

a second differential means, connected to said second dividing means, for detecting a signal of a difference between said second pair of signals divided by said second dividing means; and a first composite means for composing a signal from an output signal associated with said first differential means and an output signal associated with said second differential means.

2. A vibrating gyroscope according to claim 1, which further comprises a synchronous detection means, connected to said first composite means, for synchronously detecting a signal from said first composite means; and a smoothing means, connected to said synchronous detecting means, for smoothing a signal from said synchronous detection means.

3. A vibrating gyroscope according to claim 1, which further comprises a first synchronous detection means for synchronously detecting a signal from said first differential means;

a first smoothing means, connected to said first synchronous detection means, for smoothing a signal from said first synchronous detection means;

a second synchronous detection means for synchronously detecting a signal from said second differential means; and a second smoothing means, connected to said second synchronous detection means, for smoothing a signal from said second synchronous detection means; wherein said first composite means further composes said signal from an output signal from said first smoothing means and an output signal from said second smoothing means.

4. A vibrating gyroscope according to claim 3, which further comprises a third synchronous detection means, connected to said driving means, for synchronously detecting a signal associated with a driving signal from said driving means;

a third smoothing means, connected to said third synchronous detection means, for smoothing a signal from said third synchronous detection means;

a second composite means, connected to said first and third smoothing means, for composing a signal from said output signal from said first smoothing means and an output signal from said third smoothing means;

a fourth synchronous detection means, connected to said driving means, for synchronously detecting the signal associated with said driving signal;

a fourth smoothing means, connected to said fourth synchronous detecting means, for smoothing a signal from said fourth synchronous detection means; and a third composite means, connected to said second and fourth smoothing means, for composing a signal from said output signal from said second smoothing means and an output signal from said fourth smoothing means; wherein said first composite means further composites said signal from an output signal from said second composite means and an output signal from said third composite means.

5. A vibrating gyroscope according to claim 3, which further comprises a second composite means, connected to said driving means and said first differential amplifier, for composing a signal from said output signal from said first differential means and a signal associated with a driving signal from said driving means; and a third composite means, connected to said driving means and said second differential means, for composing a signal from said output signal from said second differential means and the signal associated with said driving signal; wherein said first synchronous detection means synchronously detects an output signal from said second composite means;

said second synchronous detection means synchronously detects an output signal from said third composite means.

6. A vibrating gyroscope having two driving and detecting circuit elements driven by a driving means and a feedback element, said vibrating gyroscope comprising:

a dividing means for dividing a signal from one of said two driving and detecting elements into two signals which are different levels, said dividing means including two pairs of serially connected resistors;

a detecting means comprising a differential amplifier, connected to one pair of serially connected resistors of said dividing means, for detecting a signal of a difference between said two signals divided by said dividing means; and a first synchronous detection means for synchronously detecting an output signal associated with said detecting means and an output signal associated with said feedback element.

7. A vibrating gyroscope according to claim 6, which further comprises a first smoothing means, connected to said first synchronous detection means, for smoothing a signal from said first synchronous detection means.

8. A vibrating gyroscope according to claim 7, which further comprises a second synchronous detection means, connected to said driving means, for synchronously detecting a signal associated with a driving signal from said driving means;

a second smoothing means, connected to said second synchronous detection means, for smoothing an output signal from said second synchronous detection means; and a composite means, connected to said first and second smoothing means, for composing a signal from an output signal from said first smoothing means and an output signal from said second smoothing means.

9. A vibrating gyroscope according to claim 7, which further comprises a composite means, connected to said driving means and said first differential means, for composing a signal from an output signal from said differential means and an output signal associated with a driving signal from said driving means, wherein said first synchronous detection means synchronously detects an output signal from said composite means.

* * * * *